US011972774B2

(12) United States Patent
Gupta et al.

(10) Patent No.: US 11,972,774 B2
(45) Date of Patent: Apr. 30, 2024

(54) SYSTEM AND METHOD FOR ASSESSING QUALITY OF A SINGING VOICE

(71) Applicant: NATIONAL UNIVERSITY OF SINGAPORE, Singapore (SG)

(72) Inventors: Chitralekha Gupta, Singapore (SG); Haizhou Li, Singapore (SG); Ye Wang, Singapore (SG)

(73) Assignee: National University of Singapore, Singapore (SG)

( * ) Notice: Subject to any disclaimer, the term of this patent is extended or adjusted under 35 U.S.C. 154(b) by 307 days.

(21) Appl. No.: 17/631,646

(22) PCT Filed: Aug. 5, 2020

(86) PCT No.: PCT/SG2020/050457
§ 371 (c)(1),
(2) Date: Jan. 31, 2022

(87) PCT Pub. No.: WO2021/025622
PCT Pub. Date: Feb. 11, 2021

(65) Prior Publication Data

US 2022/0277763 A1 Sep. 1, 2022

(30) Foreign Application Priority Data

Aug. 5, 2019 (SG) ........................... 10201907238Y

(51) Int. Cl.
*G10L 25/60* (2013.01)
*G10H 1/36* (2006.01)
*G10L 25/90* (2013.01)

(52) U.S. Cl.
CPC ............. *G10L 25/60* (2013.01); *G10H 1/361* (2013.01); *G10L 25/90* (2013.01); *G10H 2210/066* (2013.01); *G10H 2210/091* (2013.01)

(58) Field of Classification Search
CPC ......... G10L 25/60; G10L 25/90; G10H 1/361; G10H 2210/066; G10H 2210/091
(Continued)

(56) References Cited

U.S. PATENT DOCUMENTS 8,138,409 B2 * 3/2012 Brennan ................ G09B 15/00 463/7
10,726,874 B1 * 7/2020 Smith .................. G11B 27/036
(Continued)

FOREIGN PATENT DOCUMENTS

CN 103999453 A * 8/2014 .......... G06F 3/0482
CN 106384599 A 2/2017
(Continued)

OTHER PUBLICATIONS

The International Search Report and The Written Opinion of The International Searching Authority for PCT/SG2020/050457, ISA/SG, Singapore, SG, dated Sep. 23, 2020.
(Continued)

*Primary Examiner* — Sean H Nguyen
(74) *Attorney, Agent, or Firm* — Botos Churchill IP Law LLP

(57) ABSTRACT

Disclosed is a system for assessing quality of a singing voice singing a song. The system comprises memory and at least one processor. The memory stores instructions that, when executed by the at least one processor, cause the at least one processor to receive a plurality of inputs comprising a first input and one or more further inputs, each input comprising a recording of a singing voice singing the song, to determine, for the first input, one or more relative measures of quality of the singing voice by comparing the first input to each further input; and to assess quality of the singing voice of the first input based on the one or more relative measures. Also disclosed is a method implemented on such a system.

18 Claims, 9 Drawing Sheets

(58) Field of Classification Search
USPC .......................................................... 381/56
See application file for complete search history.

(56) References Cited

U.S. PATENT DOCUMENTS

| | | | | |
|---|---|---|---|---|
| 2009/0193959 | A1* | 8/2009 | Mestres | .................. G10L 25/48 84/609 |
| 2017/0140745 | A1* | 5/2017 | Nayak | ................. H04L 65/1089 |
| 2018/0240448 | A1 | 8/2018 | Nariyama et al. | |

FOREIGN PATENT DOCUMENTS

| | | | | | |
|---|---|---|---|---|---|
| CN | 110033784 | A | | 7/2019 | |
| CN | 111863033 | A | * | 10/2020 | ........... G10L 15/063 |
| CN | 112309351 | A | * | 2/2021 | |
| KR | 20150018194 | A | * | 2/2015 | ............. G11B 31/02 |

OTHER PUBLICATIONS

Gupta , et al., “Automatic Evaluation of Singing Quality without a Reference,” APSIPA ASC, Hawaii, 2018, pp. 990-997.

* cited by examiner

SYSTEM AND METHOD FOR ASSESSING QUALITY OF A SINGING VOICE

CROSS-REFERENCE TO RELATED APPLICATIONS

The present application is a national phase entry under 35 U.S.C. § 371 of International Application No. PCT/SG2020/050457, filed Aug. 5, 2020, published in English, which claims priority from Singapore Patent Application Serial No. 10201907238Y, filed Aug. 5, 2019, both of which are incorporated herein by reference.

TECHNICAL FIELD

The present invention relates, in general terms, to a system for assessing quality of a singing voice singing a song, and a method implement or instantiated by such a system. The present invention particularly relates to, but is not limited to, evaluation of singing quality without using a standard reference for that evaluation.

BACKGROUND

Singing has always been a popular medium of social recreation. Many amateur and aspiring singers desire to improve their singing ability. This is often done with reference to a baseline tune sung by an expert singer that the amateur or aspiring singer endeavours to emulate. Music experts evaluate singing quality with the help of their music knowledge and perceptual appeal.

Computer-assisted singing learning tools have been found to be useful for singing lessons. Recently, karaoke singing apps and online platforms have provided a platform for people to showcase their singing talent, and a convenient way for amateur singers to practice and learn singing. They also provide an online competitive platform for singers to connect with other singers all over the world and improve their singing skills. Automatic singing evaluation systems on such platforms typically compare a sample singing vocal with a standard reference such as a professional singing vocalisation or the song melody notes to obtain an evaluation score. For example, Perceptual Evaluation of Singing Quality (PESnQ) measures the similarity between a test singing (i.e. singing voice) and a reference singing in terms of pitch, rhythm, vibrato, etc. However, such methods are constrained either by the need for a professional grade singer, or the availability of a digital sheet music for every song, to establish a baseline tune or melody against which each singer's test singing can be compared. The aesthetic perception of singing quality is very subjective and varies between evaluators. As a result, even experts often disagree on the perfection of a certain performance. The choice of an ideal or gold-standard reference singer brings in a bias of subjective choice.

Aspiring singers upload cover versions of their favourite songs to online platforms, that are listened to and liked by millions across the globe. However, discovering talented singers from such huge datasets is a challenging task. Moreover, oftentimes the cover songs don't follow the original music scores, but rather demonstrate the creativity and singing style of individual singers. In such cases, reference singing or musical score-based evaluation methods are less than ideal for singing evaluation.

There have been a few studies on evaluating singing quality without a standard reference. However, these studies typically focus on a single measure to infer singing quality and disregard other characteristics of singing. Using pitch as an example, if a singer sings only one note throughout the song, pitch interval accuracy will classify it as good singing. Therefore, it fails fundamentally and overlooks the occurrence of several notes in a song and different notes being sustained for different durations.

In addition, many such methods still require a reference melody to determine whether note locations (i.e. timing) is correct.

It would be desirable to overcome or ameliorate at least one of the above-described problems with prior art singing quality evaluation schema, or at least to provide a useful alternative.

SUMMARY

Automatic evaluation of singing quality can be done with the help of a reference singing or the digital sheet music of the song. However, such a standard reference is not always available. Described herein is a framework to rank a large pool of singers according to their singing quality without any standard reference. In various embodiments, this ranking methodology involves identifying musically motivated absolute measures (i.e. of singing quality) based on a pitch histogram, and relative measures based on inter-singer statistics to evaluate the quality of singing attributes such as intonation and rhythm.

The absolute measures evaluate the how good a pitch histogram is for a specific singer, while the relative measures use the similarity between singers in terms of pitch, rhythm, and timbre as an indicator of singing quality. Thus, embodiments described herein combine absolute measures and relative measures in the assessment of singing quality the corollary of which is then to rank singers amongst each other. With the relative measures, the concept of veracity or truth-finding is formulated for ranking of singing quality. A self-organizing approach to rank-ordering a large pool of singers based on these measures has been validated as set out below. The fusion of absolute and relative measures results in an average Spearman's rank correlation of 0.71 with human judgments in a 10-fold cross validation experiment, which is close to the inter-judge correlation.

Humans are known to be better at relative judgments, i.e. choosing the best and the worst among a small set of singers, than they are at producing an absolute rating. As a result, the present disclosure explores and validates the idea of automatically generating a leader board of singers, where the singers are rank-ordered according to their singing quality relative to each other. With the immense number of online uploads on singing platforms, it is now possible with the present teachings to leverage comparative statistics between singers as well as music theory to derive such a leader board of singers.

Embodiments of the systems and methods disclosed herein can rank and evaluate singing vocals of many different singers singing the same song, without needing a reference template singer or a gold-standard. The present algorithm, when combined with the other features of the method with which it interacts, will be useful as a screening tool for online and offline singing competitions. Embodiments of the algorithm can also provide feedback on the overall singing quality as well as on underlying parameters such as pitch, rhythm, and timbre, and can therefore serve as an aid to the process of learning how to sing better, i.e. a singing teaching tool.

Disclosed herein is a system for assessing quality of a singing voice singing a song, comprising:

memory; and at least one processor, wherein the memory stores instructions that, when executed by the at least one processor, cause the at least one processor to:

receive a plurality of inputs comprising a first input and one or more further inputs, each input comprising a recording of a singing voice singing the song;

determine, for the first input, one or more relative measures of quality of the singing voice by comparing the first input to each further input; and assess quality of the singing voice of the first input based on the one or more relative measures.

The at least one processor may determine one or more relative measures by assessing a similarity between the first input and each further input. The at least one processor may assess a similarity between the first input and each further input by, for each relative measure, assessing one or more of a similarity of pitch, rhythm and timbre. The at least one processor may assess the similarity of pitch, rhythm and timbre as being inversely proportional to a pitch-based relative distance, rhythm-based relative distance and timbre-based relative distance respectively of the singing voice of the first input relative to the singing voice of each further input. For a second input comprising a recording of a singing voice singing the song, the at least one processor may determine the singing voice of the first input to be higher quality than the singing voice of the second input if the similarity between the first input and each further input is greater than a similarity between the second input and each further input.

The instructions may further cause at least one processor to determine, for the first input, one or more absolute measures of quality of the singing voice, and assess quality of the singing voice based on the one or more relative measures and the one or more absolute measures. Each absolute measure of the one or more absolute measures may be an assessment of one or more of pitch, rhythm and timbre of the singing voice of the first input. At least one said absolute measure may be an assessment of pitch based on one or more of overall pitch distribution, pitch concentration and clustering on musical notes. The at least one processor may assess pitch by producing a pitch histogram, and assesses a singing voice as being of higher quality as peaks in the pitch histogram become sharper.

The instructions may further cause the at least one processor to rank the quality of the singing voice of the first input against the quality of the singing voice of each further input.

Also disclosed herein is a method for assessing quality of a singing voice singing a song, comprising:

receiving a plurality of inputs comprising a first input and one or more further inputs, each input comprising a recording of a singing voice singing the song;

determining, for the first input, one or more relative measures of quality of the singing voice by comparing the first input to each further input; and assessing quality of the singing voice of the first input based on the one or more relative measures.

Determining one or more relative measures may comprise assessing a similarity between the first input and each further input. Assessing a similarity between the first input and each further input may comprise, for each relative measure, assessing one or more of a similarity of pitch, rhythm and timbre. The similarity of pitch, rhythm and timbre may be assessed as being inversely proportional to a pitch-based relative distance, rhythm-based relative distance and timbre-based relative distance respectively of the singing voice of the first input relative to the singing voice of each further input.

For a second input comprising a recording of a singing voice singing the song, the singing voice of the first input may be determined to be higher quality than the singing voice of the second input if the similarity between the first input and each further input is greater than a similarity between the second input and each further input.

The method may further comprise determining, for the first input, one or more absolute measures of quality of the singing voice, and assessing quality of the singing voice based on the one or more relative measures and the one or more absolute measures. Each absolute measure of the one or more absolute measures may be an assessment of one or more of pitch, rhythm and timbre of the singing voice of the first input. At least one said absolute measure may be an assessment of pitch based on one or more of overall pitch distribution, pitch concentration and clustering on musical notes. Assessing pitch may involve producing a pitch histogram, and wherein a singing voice is assessed as being of higher quality as peaks in the pitch histogram become sharper.

The method may further comprise ranking the quality of the singing voice of the first input against the quality of the singing voice of each further input.

Presently, there is no available method for reference-independent, rank-ordering of singers. Advantageously, embodiments of the system and method described herein enable automatic rank ordering of singers without relying on a reference singing rendition or melody. As a result, automatic singing quality evaluation is not constrained by the need for a reference template (e.g. baseline melody or expert vocal rendition) for each song against which a singer is being evaluated.

Similarly, there is presently no available tool that provides research-validated feedback on underlying musical parameters for singing quality evaluation. Embodiments of the algorithm described herein, when used in conjunction with other features described herein, can serve as an aid to singing teaching that provides feedback on overall singing quality as well as on underlying parameters such as pitch, rhythm, and timbre.

Advantageously, embodiments of the present invention provide evaluation of singing quality based on the musically-motivated absolute measures that quantify various singing quality discerning properties of a pitch histogram. Consequently, the singer may be creative and not copy the reference or baseline melody exactly, and yet sound good be evaluated as such. Accordingly, such an evaluation of singing quality helps avoid penalising singers for creativity and captures the inherent properties of singing quality.

Advantageously, embodiments provide singing quality evaluation based on truth pattern finding based musically-inform relative measures both singing quality, that leverage inter-singer statistics. This provides a self-organising data-driven way of rank-ordering singers, to avoid relying on a reference or template—e.g. baseline melody.

Advantageously, embodiments of the present invention enable evaluation of underlying parameters such as pitch, rhythm and the timbre without relying on a reference. Experimental evidence discussed herein indicates that machines can provide the law robust and unbiased assessment of the underlying parameters of singing quality when compared with a human assessment.

BRIEF DESCRIPTION OF THE DRAWINGS

Embodiments of the present invention will now be described, by way of non-limiting example, with reference to the drawings in which.

DETAILED DESCRIPTION

It has been determined that music experts can evaluate singing quality with high consensus when the melody or the song is unknown to them. This suggests that there are inherent properties of singing quality that are independent of a reference singer or melody, which help the music-experts judge singing quality without a reference. The present disclosure explores these properties and proposes methods to automatically evaluate singing quality without depending on a reference, and systems that implements such methods.

The teachings of the present disclosure are extended to cover the discovery of good or quality singers from a large number singers by assessing the similarities all the relative distances between singers. Based on the concept of veracity, it is postulated that good singers sing alike or similarly and bad singers seem very differently to each other. Consequently, if all singers sing the same song, the good singers will share many characteristics such as frequently it notes, the sequence of notes and the overall consistency in the rhythm of the song. Conversely, different poor singers will deviate from the intended song in different ways. For example, one poor singer may be out of tune at certain notes while another may be at other notes. As a result, relatives measures based on inter-singer distance can serve as an indicator of singing quality.

Embodiments of the methods and systems described herein provide a framework to combine pitch histogram-based measures with the inter-singer distance measures to provide a comprehensive singing quality assessment without relying on a standard reference. We assess the performance of our algorithm by comparing against human judgments.

In the context of singing pedagogy, a detailed feedback to a learner about their performance with respect to the individual underlying perceptual parameters such as pitch, rhythm, and timbre, is important. Although humans are known to provide consistent overall judgments, they are not good at objectively judging the quality of individual underlying parameters. As such, singing quality evaluation schema described herein outperform human judges in this regard.

Figure 1:
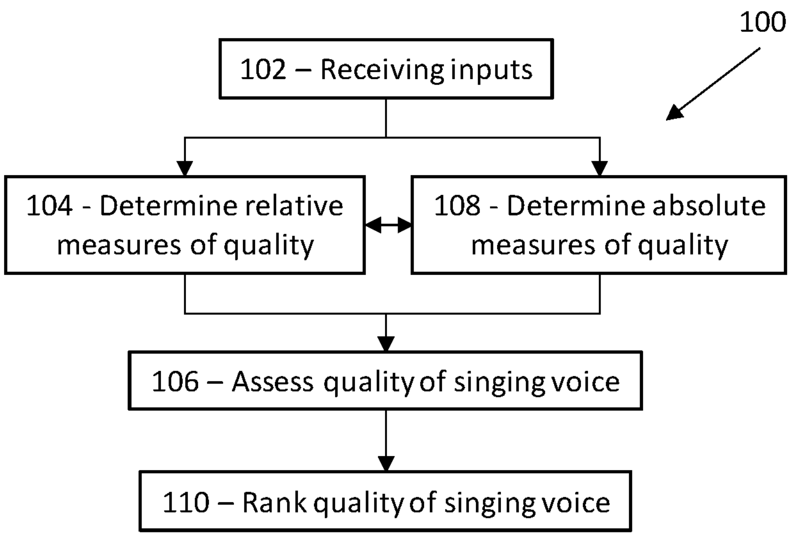
FIG. 1 provides a method in accordance with present teachings, for assessing singing quality.

Such a method for assessing quality of the singing voice singing a song is described with reference to the steps shown in FIG. 1. The method 100 broadly comprises:

Step 102: receiving a plurality of inputs. The inputs comprise a first input and one or more further inputs. Each input comprising a recording of a singing voice singing the song. The first input is the recording of the singing voice for which the assessment is being made. Each further input is a recording of a singing voice against which the first input is being assessed, which may be the singing voice of another singer or another recording made by the same singer is that who recorded the first input.

Step 104: determining, for the first input, one or more relative measures of quality of the singing voice. As will be discussed in greater detail below, this is performed by comparing the first input to each further input.

Step 106: assessing quality of the singing voice of the first input based on the one or more relative measures.

Figure 2:
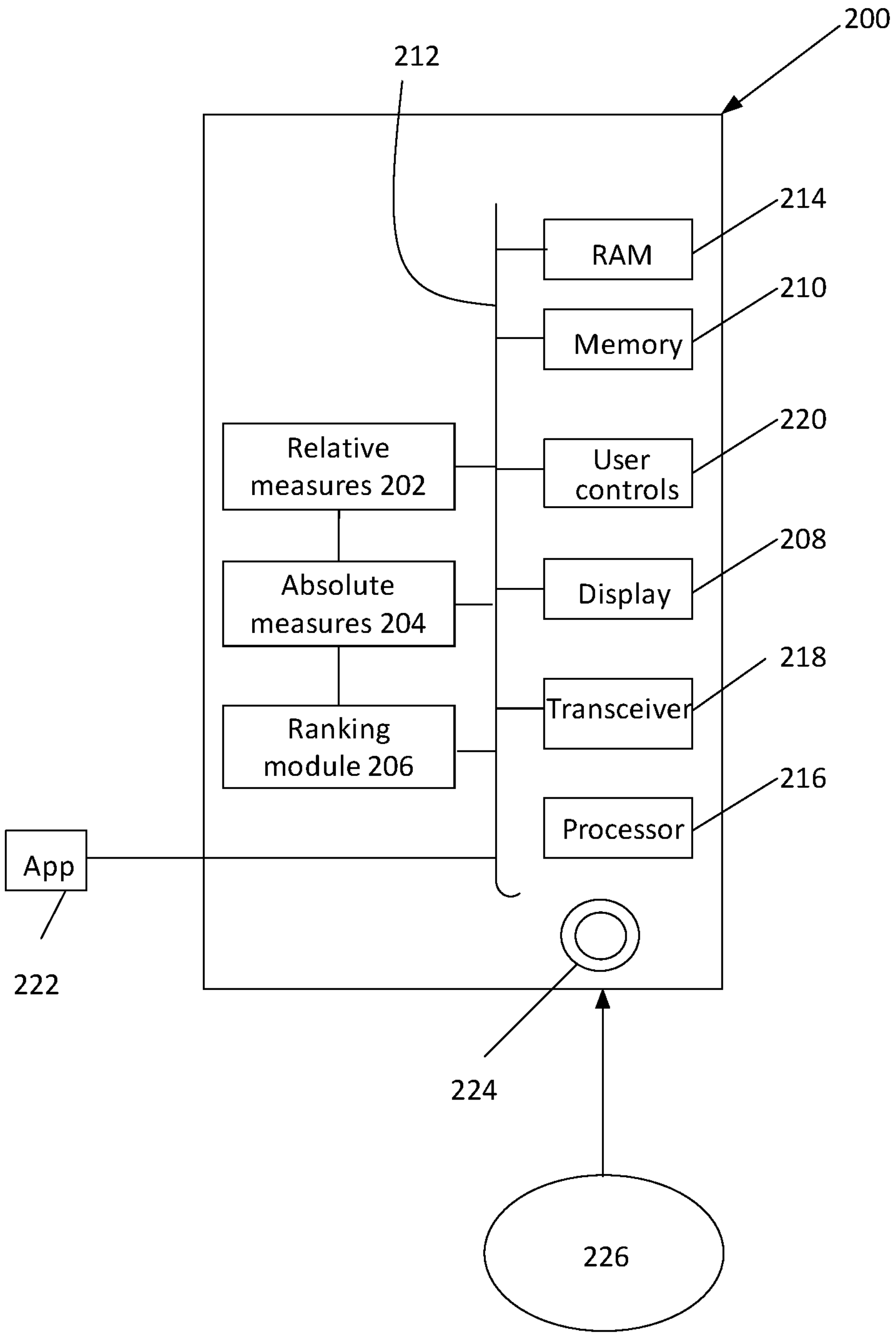
FIG. 2 provides a schematic diagram of a system for performing the method of FIG. 1.

The method 100 may be executed in a computer system such as that shown in FIG. 2. As set out briefly below, the computer system is for assessing quality of the singing voices singing a song, and will comprise memory and at least one processor, the memory storing instructions that when executed by the at least one processor will cause the computer system to perform method 100.

Various embodiments of method 100 make the following major contributions each of which is discussed in greater detail below. Firstly, embodiments of the method 100 uses novel inter-singer relative measures based on the concept of veracity, that enable rank-ordering of a large number of singing renditions without relying on reference singing. Secondly, embodiments of the method 100 uses a combination of absolute and relative measures to characterise the inherent properties of singing quality—e.g. those that might be picked up by a human assessor but not by known machine-based assessors.

The method 100 may be employed, for example, on a computer system 200 as shown in FIG. 2. The block diagram of the computer system 200 will typically be a desktop computer or laptop. However, the computer system 200 may instead be a mobile computer device such as a smart phone, a personal data assistant (PDA), a palm-top computer, or multimedia Internet enabled cellular telephone.

As shown, the computer system 200 includes the following components in electronic communication via a bus 212:

(a) relative measures module 202;
(b) absolute measures module 204;
(c) ranking module 206;
(d) a display 208;
(e) non-volatile (non-transitory) memory 210;
(f) random access memory ("RAM") 214;
(g) N processing components embodied in processor module 216;
(h) a transceiver component 218 that includes N transceivers; and
(i) user controls 220.

Although the components depicted in FIG. 2 represent physical components, FIG. 2 is not intended to be a hardware diagram. Thus, many of the components depicted in FIG. 2 may be realized by common constructs or distributed among additional physical components. Moreover, it is certainly contemplated that other existing and yet-to-be developed physical components and architectures may be utilized to implement the functional components described with reference to FIG. 2.

The three main subsystems the operation of which is described herein in detail are the relative measures module 202, the absolute measures module 204 and the ranking module 206. The various measures calculated by module 202 and 204, and/or the ranking is determined by module 206, may be displayed on display 208. The display 208 may be realized by any of a variety of displays (e.g., CRT, LCD, HDMI, micro-projector and OLED displays).

In general, the non-volatile data storage 210 (also referred to as non-volatile memory) functions to store (e.g., persistently store) data and executable code, such as the instructions necessary for the computer system 200 to perform the method 100, the various computational steps required to achieve the functions of modules 202, 204 and 206. The executable code in this instance thus comprises instructions enabling the system 200 to perform the methods disclosed herein, such as that described with reference to FIG. 1.

In some embodiments for example, the non-volatile memory 210 includes bootloader code, modem software, operating system code, file system code, and code to facilitate the implementation components, well known to those of ordinary skill in the art that, for simplicity, are not depicted nor described.

In many implementations, the non-volatile memory 210 is realized by flash memory (e.g., NAND or ONENAND memory), but it is certainly contemplated that other memory types may be utilized as well. Although it may be possible to execute the code from the non-volatile memory 210, the executable code in the non-volatile memory 210 is typically loaded into RAM 214 and executed by one or more of the N processing components 216.

The N processing components 216 in connection with RAM 214 generally operate to execute the instructions stored in non-volatile memory 210. As one of ordinarily skill in the art will appreciate, the N processing components 216 may include a video processor, modem processor, DSP, graphics processing unit, and other processing components. The N processing components 216 may form a central processing unit (CPU), which executes operations in series. In some embodiments, it may be desirable to use a graphics processing unit (GPU) to increase the speed of analysis and thereby enable, for example, the real-time assessment of singing quality—e.g. during performance of the song. Whereas a CPU would need to perform the actions using serial processing, a GPU can provide multiple processing threads to identify features/measures or compare singing inputs in parallel.

The transceiver component 218 includes N transceiver chains, which may be used for communicating with external devices via wireless networks, microphones, servers, memory devices and others. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Reference numeral 224 indicates that the computer system 200 may include physical buttons, as well as virtual buttons such as those that would be displayed on display 208. Moreover, the computer system 200 may communicate with other computer systems or data sources over network 226.

It should be recognized that FIG. 2 is merely exemplary and that the functions described herein may be implemented in hardware, software, firmware, or any combination thereof. If implemented in software, the functions may be stored on, or transmitted as, one or more instructions or code encoded on a non-transitory computer-readable medium 210. Non-transitory computer-readable medium 210 includes both computer storage medium and communication medium including any medium that facilitates transfer of a computer program from one place to another. A storage medium may be any available medium that can be accessed by a computer, such as a USB drive, solid state hard drive or hard disk.

To provide versatility, it may be desirable to implement the method 100 in the form of an app, or use an app to interface with a server on which the method 100 is executed. These functions and any other desired functions may be achieved using apps 222, which can be installed on a mobile device. The apps 222 may also enable singers using separate devices to compete in a singing competition evaluated using the method 100—e.g. to see who achieves the highest ranking whether at the end of a song or in real time during performance of the song.

Musically-Motivated Measures

Some studies have found that human judges can evaluate singers with high consistency even when the songs are unknown to the judges. This finding suggests that singing quality judgment depends more on common, objective features rather than subjective preference. Moreover, experts make their judgment neither relying on their memory of the song, nor a reference melody.

Subjective assessment studies suggest that the most important properties for singing quality evaluation are pitch and rhythm. To enable an automated assessment to be performed, the method 100 further includes step 108, for determining absolute measures of quality (the pitch being one such absolute measure), and the memory 210 similarly includes instructions to cause the N processing units 216 to determine, using module 206, one or more absolute measures of quality of the singing voice of the first input (i.e. the input being assessed). Quality of the singing voice can then be assessed based on one or more relative measures discussed below, and one or more absolute measures such as the pitch, rhythm and timbre.

Considering pitch firstly, pitch is an auditory sensation in which a listener assigns musical tones to relative positions on a musical scale based primarily on their perception of the frequency of vibration. Pitch is characterized by the fundamental frequency FO and its movements between high and low values. Musical notes are the musical symbols that indicate the pitch values, as well as the location and duration of pitch, i.e. the timing information or the rhythm of singing. In karaoke singing, visual cues to the lyric lines to be sung are provided to help the singer have control over the rhythm of the song. Therefore, in the context of karaoke singing, rhythm is not expected to be a major contributor to singing quality assessment. Pitch, however, can be perceived and computed. Therefore, characterization of singing pitch is a focus of the system 200. The particular qualities sought to be extracted from the inputs can include one or more of the overall pitch distribution of a singing voice, the pitch concentration and clustering on musical notes. To perform this extraction, pitch histograms can be useful.

A. Pitch Histogram

Pitch histograms are global statistical representations of the pitch content of a musical piece. They represent the distribution of pitch values in a sung rendition. A pitch histogram is computed as the count of the pitch values folded on to the 12 semitones in an octave. To enable an analysis, the methods disclosed herein may calculate pitch values in the unit of cents (one semitone being 100 cents on equi-tempered octave). That calculation may be performed according to:

$$f_{cent} = \log_2 \frac{f_{Hz}}{440} \tag{1}$$

where 440 Hz (pitch-standard musical note A4) is considered as the base frequency. Presently, pitch estimates are produces from known auto-correlation based pitch estimators. Thereafter, a generic post-processing step is used to remove frames with low periodicity.

Computing the pitch histogram may comprise removing the key of the song. A number of steps may be performed here. This can involve converting pitch values to an equi-tempered scale (cents). This may also involve subtracting the median from the pitch values. Since median does not represent the tuning frequency of a singer, the pitch histogram obtained this way may show some shift across singers. However, it does not affect the strength of the peaks and valleys in the histogram. Also, as the data used to validate this calculation was taken from karaoke where the singers sang along with the background track of the song—accordingly, the key is supposed to remain the same across singers (i.e. it cannot be used as a benchmark).

The median of pitch values in a singing rendition is subtracted. All pitch values are transposed to a single octave, i.e. within −600 to +600 cents. The pitch histogram H is then calculated by placing the pitch values into corresponding bins (i.e. subranges in the single octave into which all pitch values are transposed):

$$H_k = \Sigma_{n-1}^{N} m_k \tag{2}$$

where $H_k$ is the $k^{th}$ bin count, N is the number of pitch values, $m_k=1$ if $c_k \leq P(n) \leq c_k+1$ and mk=0 otherwise, where P(n) is the $n^{th}$ pitch value in an array of pitch values and ($c_k$, $c_k+1$) are the bounds on $k^{th}$ bin in cents in the octave to which all the pitch values are transposed. To obtain a fine histogram representation, each semitone was divided into 10 bins. Thus, 12 semitones×10 bins each=120 bins in total, each representing 10 cents. It will be appreciated that a different number of bins may be used and/or each pin may represent a number of cents other than 10.

The melody of a song typically consists of a set of dominant musical notes (or pitch values). These are the notes that are hit frequently in the song and sometimes are sustained for long duration. These dominant notes are a subset of the 12 semitones present in an octave. The other semitones may also be sung during the transitions between the dominant notes, but are comparatively less frequent and not sustained for long durations. Thus, in the pitch histogram of a good singing vocal of a song, these dominant notes should appear as the peaks, while the transition semitones appear in the valley regions.

Figure 3:
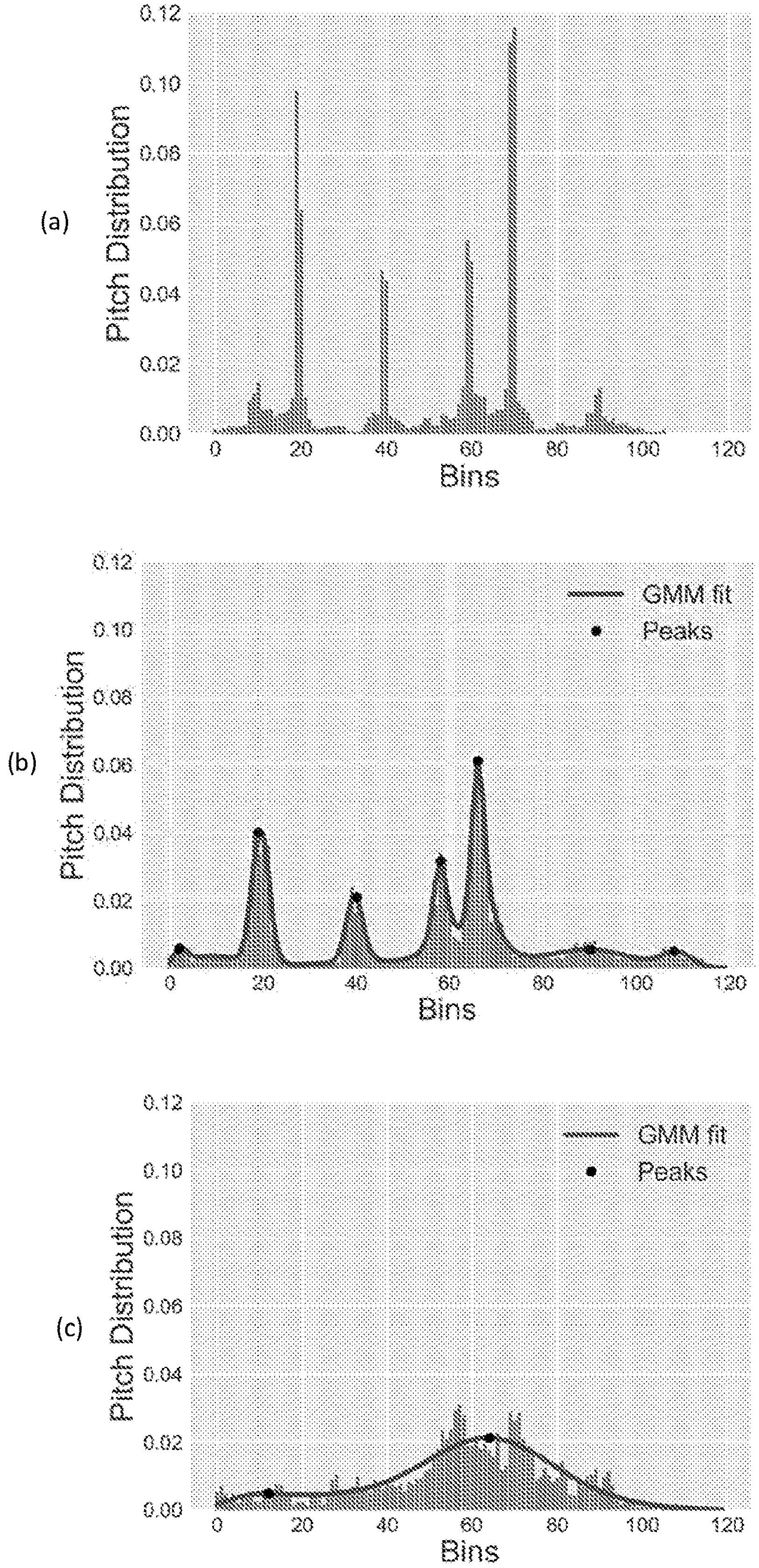
FIG. 3 is a normalized pitch histogram for (a) MIDI, and GMM-fit and detected peaks (dots) on normalized pitch histogram for (b) good singing (c) poor singing of the song "I have a dream" by ABBA. (1 bin=10 cents)

FIG. 3 shows the pitch histogram of a MIDI (Musical Instrument Digital Interface) signal (FIG. 3*a*), the pitch histogram of a good singing vocal or vocalisation (FIG. 3*b*), and a poor singing vocal or vocalisation (FIG. 3*c*), all performing the same song. The area of histogram is normalized to 1. The MIDI version contains the notes of the original composition, and therefore represents the canonical pitch histogram of the song. It is apparent that the good singer histogram should be close to the MIDI histogram. The MIDI histogram has four sharp peaks showing that those pitch values are frequently and consistently hit, more than the rest of the pitch values. Since, generally, a song consists of only a set of dominant notes, the sharp, narrow, and well-defined spikes/peaks of the good singer's pitch histogram indicate that the notes of the song are being hit repeatedly and consistently, in a similar manner to the MIDI histogram. On the other hand, the poor singer has a dispersed distribution of pitch values that reflect that the singer is unable to hit the dominant notes of the song consistently. Therefore, a singing voice may be assessed as being of higher quality as peaks in the pitch histogram become sharper.

Some statistical measures, kurtosis and skew, were used to measure the sharpness of the pitch histogram. These are overall statistical indicators that do not place much emphasis on the actual shape of the histogram, which could be informative about the singing quality. Therefore, for present purposes, the musical properties of singing quality are characterised with the 12 semitones pitch histogram. It is expected that the shape of this histogram, for example, the number of peaks, the height and spread of the peaks, and the intervals between the peaks contain vital information about how well the melody is sung. Therefore, assessing the singing voice may involve determining one or more of the numbers of peaks in the histogram, the height of the peaks, the spread (or sharpness) of the peaks and/or the intervals between the peaks. Although the correctness or accuracy of the notes being sung can be directly determined when the notes of the song are not available, the consistency of the pitch values being hit, which is an indicator of the singing quality, can still be measured.

B. Pitch Assessment from the Perspective of Overall Pitch Distribution

Overall pitch distribution is a group of global statistical measures that computes the deviation of the pitch distribution from a normal distribution. As seen in FIG. 3, the pitch histograms of good singers show multiple sharp peaks, while those of poor singers show a dispersed distribution of pitch values. Therefore, the histogram of a poor singer will be closer to a normal distribution, than that of a good singer. Accordingly, assessing the quality of the singing voice of the first input may involve analysing the overall pitch distribution.

1) Kurtosis: Kurtosis is a statistical measure (fourth standardized moment) of whether the data is heavy tailed or light tailed relative to a normal distribution, defined as:

$$Kurt = E\left[\left(\frac{\vec{x}-\mu}{\sigma}\right)^4\right] \quad (3)$$

where $\vec{x}$ is the data vector, which in the present case is the pitch values over time, μ is the mean and a is the standard deviation of $\vec{x}$.

A good singer's pitch histogram is expected to have several sharp spikes, as shown in FIG. 3*b*. Therefore, a good singer's pitch histogram should not reflect a normal distribution. A corollary of this is that a good singer would have a higher kurtosis value than a poor singer. Accordingly, assessing the quality of the singing voice of the first input may involve assessing kurtosis, where a higher kurtosis is indicative of better quality singing.

2) Skew: Skew is a measure of the asymmetry of a distribution with respect to the mean, defined as:

$$\text{Skew} = E\left[\left(\frac{\vec{x}-\mu}{\sigma}\right)^3\right] \quad (4)$$

where $\vec{x}$ is the data vector, μ is the mean and σ is the standard deviation of $\vec{x}$.

The pitch histogram of a good singer has peaks around the notes of the song, whereas that of a poor singer is expected to be more dispersed and spread out relatively symmetrically. So, the pitch histogram of a poor singer is expected to be closer to a normal distribution FIG. 3*c*, or more symmetrical. Accordingly, assessing the quality of the singing voice of the first input may involve assessing skew, where higher asymmetry as reflected by the skew value is indicative of better quality singing.

C. From the Perspective of Pitch Concentration

The previous group of measures considered the overall distribution of the pitch values with respect to a normal distribution. However, those measures do not reference whether the singing vocal hits the musical notes. For example, a consistent, incorrect note may be sung that leads to a very distinct peak in a histogram. It would therefore be useful quantify the precision with which the notes are being hit.

One method as taught herein for assessing singing quality involves measuring the concentration of the pitch values in the pitch histogram. Multiple sharp peaks in the histogram indicate precision in hitting the notes. Moreover, the intervals between these peaks contain information about the relative location of these notes in the song indicating the musical scale in which the song was sung.

1) Gaussian mixture model-fit (GMM-fit): To capture the fine details of the histogram, a mixture of Gaussian distributions is used to model the pitch histogram. FIGS. 3*b* and 3*c*, show the GMM-fit for a good and poor singer respectively. After experimenting with the number of mixtures, it was found that good singers require a higher number of mixtures due to them producing many concentrated, sharp peaks. Empirically, the number of mixtures was set to 150, though any suitable number may be used as appropriate. To characterise the peaks in the histogram, the local maxima in the GMM-fit are detected. A point is considered to be a good candidate peak if preceeded and succeeded by a lower value. Also, empirically, a good candidate is found if it is the highest peak within ±50 cents. The methods as taught herein may then characterise singing quality on the basis of the detected peaks. The methods may perform this characterisation in one or both of the following two ways.

Firstly, the method may measure the spread around the peak, that spread indicating the consistency with which a particular note is hit. This spread is referred to herein as the Peak Bandwidth (PeakBW), which may be defined as:

$$PeakBW = \frac{1}{N^2}\sum_{i=1}^{N} w_i^2 \quad (5)$$

where $w_i$ is the 3 dB half power down width of the $i^{th}$ detected peak.

In embodiments where the first input and further input relate to a pop song, such a song can be expected to have more than one or two significant peaks. Therefore, an additional penalty is applied if there is only a small number of peaks, by dividing by the number of peaks N. Therefore, peak-BW measure averaged over the number of peaks becomes inversely proportional to $N^2$.

Secondly, the method may involve measuring the percentage of pitch values around the peaks. This is referred to herein as the Peak Concentration (PeakConc) measure, and may be defined as:

$$PeakConc = \frac{\sum_{j=1}^{N}\sum_{i=bin_j-\Delta}^{bin_j+\Delta} A_i}{\sum_{k=1}^{M} A_k} \quad (6)$$

where N is the number of peaks, $bin_j$ is the pin number of the $j^{th}$ peak, $A_1$ is the histogram value of the $i^{th}$ bin, and M is the total number of bins (120 in the present example, each representing 10 cents). Human perception is known to be sensitive to pitch changes, but the smallest perceptible change is debatable. There is general agreement among scientists that average adults are able to recognise pitch differences of as small as 25 cents reliably. Thus, in equation (6), A is the number of bins on either side of the peak being considered, for measuring peak concentration. A represents the allowable range of pitch change in the relevant input without that input being perceived as out-of-tune. Next, empirical consideration is given to A values of ±5 and ±2 bins, i.e. ±50 cents and ±20 cents respectively, which along with the centre bin (10 cents), result in a total of 110 cents and 50 cents, respectively. These measures are referred to as $PeakConc_{110}$ and $PeakConc_{50}$ respectively.

Figure 4:
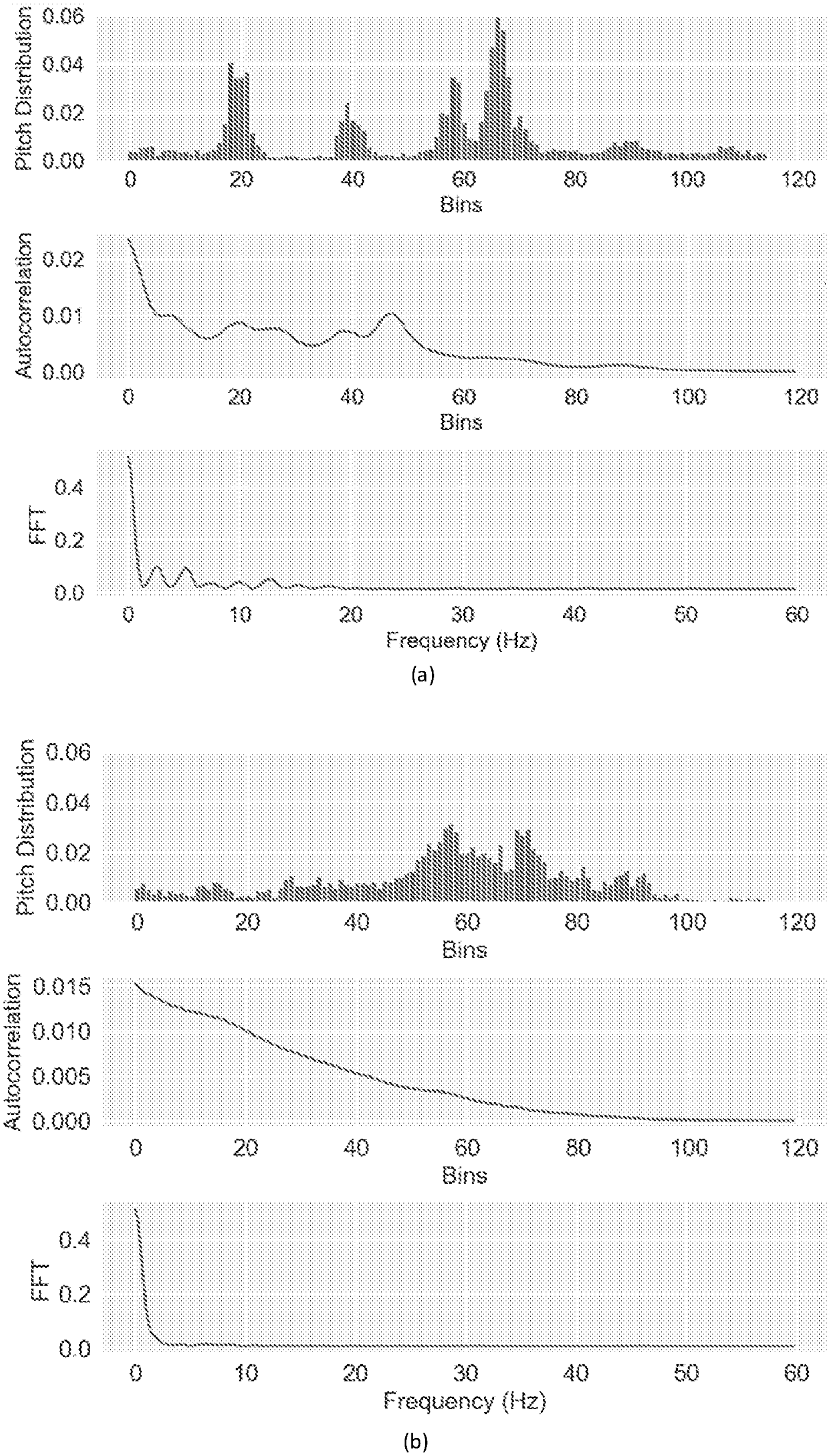
FIG. 4 is a normalized pitch histogram (1 bin=10 cents) (top), autocorrelation of the histogram (middle), and the magnitude of the Fourier transform of the autocorrelation (bottom) for (a) good singing (b) poor singing.

2) Autocorrelation: singers are supposed to sing mostly around the 12 semitones. The minimum interval is one semitone, and the intervals between the musical notes should be one or multiples of a semitone, that can be observed if we perform autocorrelation on the pitch histogram for the singer. If a good singer hits the correct notes all the time, we expect to see sharp peaks at multiples of semitones in the Fourier transform of the autocorrelation of the pitch histogram is. This is evident from FIG. 4 (bottom tier—FFT graph) where the magnitude spectrum of the autocorrelation of a good singing pitch histogram has energy in the higher frequencies representing the interval pattern of the strengthened peaks in the pitch histogram. In contrast, that of the poor singing sample only has a zero frequency component.

The present method may involve computing the autocorrelation energy ratio measure, referred to herein as Autocorr, as the ratio of the energy in the higher frequencies to the total energy in the Fourier transform of the autocorrelation of the histogram. Autocorr may be defined as:

$$Autocorr = \frac{\sum_{f=4Hz} |Y(f)|^2}{\sum_{f=0Hz} |Y(f)|^2} \tag{7}$$

where $$Y(f) = F\left(\sum_{n=1}^{120} y(n)y^*(n-l)\right) \tag{8}$$

i.e. the Fourier transform of the autocorrelation of the histogram y(n) where n is the bin number, and the total number of bins is 120, and/is the lag. The lower cut-off frequency of 4 Hz in the numerator of equation (7) corresponds to the assumption that at least 4 dominant notes are expected in a good singing rendition—i.e. 4 cycles per second. When used in the methods disclosed herein, the number of expected dominant notes may be fewer than 4 or greater than 4 as required for the particular type of music and/or particular application.

D. Clustering Based on Musical Notes

As discussed above, a song typically consists of a set of dominant musical notes. Although the melody of the song may be unknown, it is foreseeable that the pitch values, when the song is sung, will be clustered around the dominant musical notes. Therefore, those dominant notes serve as a natural reference for evaluation. The methods disclosed herein may measure clustering behaviour. The methods may achieve this in one or both of two ways.

1) k-Means Clustering: Tightly grouped clusters of pitch values across the histogram indicate that most of the pitch values are close to the cluster centres. This in turn means that the same notes are hit consistently. Keeping this idea in mind, the method may involve applying k-Means clustering to the pitch values. In the present embodiments, k=12 for the 12 semitones in an octave.

Whether the pitch values are tightly or loosely clustered can be represented by the average distance of each pitch value to its corresponding cluster centroid. This distance is inversely proportional to the singing quality, i.e. smaller the distance, better the singing quality. This singing quality may be assessed by determining an average distance of one or more pitch values of the first input to its corresponding cluster centroid. The average cluster distance may be defined as:

$$kMeans = \frac{1}{L}\sum_{i=1}^{k} d_i^2 \tag{9}$$

where L is the total number of frames with valid pitch values, and $d_i$ is the total distance of the pitch values from the centroid in $i^{th}$ cluster. This may be defined as:

$$d_i^2 = \Sigma_{j=1}^{L_i}(p_{ij} - c_i)^2 \tag{10}$$

where $p_{ij}$ is the $j^{th}$ pitch value in $i^{th}$ cluster, $c_i$ is the $i^{th}$ cluster centroid obtained from the k-Means algorithm, $L_i$ is the number of pitch values in $i^{th}$ cluster, and I ranges from 1, 2, . . . , k number of clusters.

The difference between this measure and the PeakBW measure is that PeakBW is a function of the number of dominant peaks, whereas in kMeans, the number of clusters is fixed to 12, corresponding to all the possible semitones in an octave. Thus, they are different in capturing the influence of the dominant notes on the evaluation measure.

2) Binning: Another way to measure the clustering of the pitch values is by simply dividing the 1200 cents (or 120 pitch bins) into 12 equi-spaced semitone bins, and computing the average distance of each pitch value to its corresponding bin centroid. Equations (9) and (10) hold true for this method too, the only difference is that the cluster boundaries are fixed in binning methods at 100 cents.

Therefore, the method may employ one or more of eight musically-motivated absolute measures for evaluating singing quality without a reference: Kurt, Skew, PeakBW, PeakConc $PeakConc_{50}$, kMeans, Binning and Autocorr. These are set out in Table I along with the inter-singer relative measures discussed below.

TABLE I list of musically-motivated absolute and inter-singer relative measures

| Measure Group | Sub-group based on | Measure names |
|---|---|---|
| Musically-motivated absolute measures | Overall pitch distribution | Kurt, Skew |
| | Pitch concentration | PeakBW, $PeakConc_{110}$, $PeakConc_{50}$, Autocorr |
| | Clustering | kMeans, Binning |
| Inter-singer distance-based relative measures | Pitch | pitch_med_dist |
| | | pitch_med_L2 |
| | | pitch_med_L6_L2 |
| | | pitchhist12DDistance |
| | | pitchhist120DDistance |
| | | pitchhisKLD12 |
| | | pitchhistKLD120 |
| | Rhythm | molina_rhythm_mfcc_dist |
| | | rhythm_L2 |
| | | rhythm_L6_L2 |
| | Timbre | timbral_dist |

Inter-Singer Measures

Present methods evaluate singing quality (e.g. of a first input) without a reference by leveraging on the general behaviour of the singing vocals of the same song by a large number of singers (e.g. further inputs). This approach uses inter-singer statistics to rank-order the singers in a self-organizing way.

The problem of discovering good singers from a large pool of singers is similar to that of finding true facts from a large amount of conflicting information provided by various websites. To assist, the method may employ a truth-finder algorithm that utilizes relationships between singing voices and their information. For example, a particular input, singing vocal, may be considered to be of good quality if it provides many notes or other pieces of information that are common to other ones of the inputs considered by the present methods. The premise behind the truth-finder algorithm is the heuristic that there is only one true pitch at any given location in a song. Similarly, a correct pitch, being tantamount to a true fact identifiable by a true-finder algorithm, should appear in the same or similar way in various inputs. Conversely, incorrect pictures should be different and dissimilar between inputs, because there are many ways of singing an incorrect pitch. Accordingly, the present methods may employ a true-finder algorithm to determine correct pitches on the basis that a song can be sung correctly by many people in one consistent way, but incorrectly in many different, dissimilar ways. So, the quality of a perceptual parameter of a singer is proportional to his/her similarity with other singers with respect to that parameter.

The method may therefore involve measuring similarity between singers. To achieve this, a feature may be defined that represents a perceptual parameter of singing quality, for example pitch contour. It is then assumed that all singers are singing the same song, and the feature for a particular input (i.e. of a singer) can be compared with every other input (e.g. every other singer) using a distance metric.

Accordingly, the methods disclosed herein may determine singing quality at least in part by determining how similar the first input is to each further input, wherein greater similarity reflects a higher quality singing voice—a good singer will be similar to the other good singers, therefore they will be close to each other, whereas a poor singer will be far from everyone.

Figure 5:
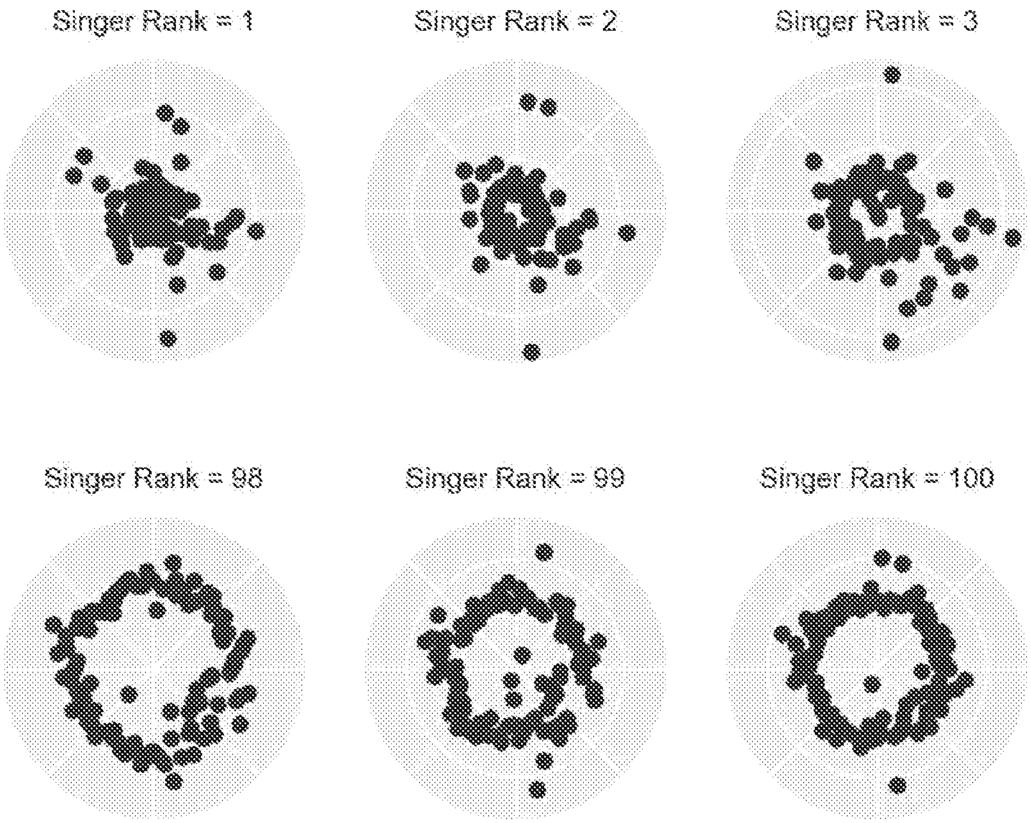
FIG. 5 is a visualization of the pitch-based relative measure distance metric pitch_med_dist between each singer and the remaining 99 singers, for the best 3 (top row) and the worst 3 (bottom row) singers among 100 singers singing the song "Let it go"

FIG. 5 is a radial visualization of the Euclidean distance between the pitch contours of 100 singers, where the centre represents the singer of interest, and the radial distance of each dot represent his/her distance (i.e. the singer of interest's) with one of the other 99 singers. The angular location of the dots is not part of the similarity metric—the angle is shown for illustration and visualisation purposes. It is evident that the best singers (top-ranked) are similar to other singers, therefore they are clustered around the centre. In contrast, the poorest singer is distant from everybody else. This observation validates the hypothesis that good singers are similar, and poor quality singers are dissimilar. This also points to viability of a method of ranking singers by their similarity with the peer singers.

In the following sub-sections, metrics are discussed that the present methods may use to measure the inter-singer distance, as summarized in Table I. These metrics measure the distance in terms of the perceptual parameters that may include one or more of, rhythm, and timbre. Embodiments of the method may then characterise singers using such distance metrics. It should be understood that assessing the quality of a singer or singing voice, being interchangeably referred to as affecting the quality of an input such as a first input and/or second input, may refer to the relevant assessment being the only assessment, or that assessing the quality of the singer or singing voice is at least in part based on the referred to assessment. In other words, where the disclosure herein refers to assessing singing quality on the basis of a distance metric, that does not preclude the assessment of singing quality also being based on one or more other parameters such as those summarised in Table-I.

A. Musically-Motivated Inter-Singer Distance Metrics

Inter-singer similarity may be measured in various ways, such as by examining pitch, rhythm and timbre in the singing.

1) Pitch-Based Relative Distance:

Intonation or pitch accuracy is directly related to the correctness of the pitch produced with respect to a reference singing or baseline melody. Rather than using a baseline melody, the present teachings may apply intonation or pitch accuracy to compare one singer with another. Importantly, it may not be known whether said another singer is a good thing or a poor singer. Therefore, assessing a singer against another singer is not the same assessment as comparing a singing voice to a baseline melody or reference singing.

The distance metrics used are the dynamic time warping (DTW) distance between the two median-subtracted pitch contours (pitch med dist), the Perceptual Evaluation of Speech Quality (PESQ)-based cognitive modeling theory—inspired pitch disturbance measures pitch med L6 L2 and pitch med L2.

Additionally, in this work, pitch histogram-based relative distance metrics are computed. As seen in FIG. 3, there is a clear distinction between the pitch distribution of a good and a poor singer. Embodiments of the present method may compute the distance between the histograms of singers using the Kullback-Liebler (KL) Divergence between the normalized pitch histograms. Moreover, as the pitch histogram is computed after subtracting the median of the pitch values, not the actual tuning frequency in which the song is sung, the pitch histograms may be shifted by a few bins across singers. To account for this shift, DTW-based distance is computed for the 12-bin and 120-bin histograms between singers as relative measures (pitchhist12KLdist, pitchhist120KLdist, pitchhist12Ddist, pitchhist120Ddist).

2) Rhythm-Based Relative Distance:

Rhythm or tempo is defined as the regular repeated pattern in music that relates to the timing of the notes sung. In karaoke singing, rhythm is determined by the pace of the background music and the lyrics cue on the screen. Therefore, rhythm inconsistencies in karaoke singing typically only occur when the singer is unfamiliar with the melody and/or the lyrics of the song.

Mel-frequency cepstral coefficients (MFCC) capture the short-term power spectrum that represents the shape of the vocal tract and thus the phonemes uttered. So, if the words are uttered at the same pace by two singers, then their rhythm is consistent. Thus, present method may compute the alignment between two singer utterances—for example, the DTW alignment between two singer utterances with respect to their MFCC vectors may be computed. Presently, the three best performing rhythm measures are used compute inter-singer rhythm distance. There may be greater or fewer rhythm measures used in the present methods depending on the application and desired accuracy. The three best performing rhythm measures presently are a rhythm deviation measure (termed as Molina_rhythm_mfcc_dist) that computes the root mean square error of the linear fit of the optimal path of DTW matrix computed using MFCC vectors, PESQ-based rhythm_L6_L2, and rhythm_L2.

3) Timbre-Based Relative Distance:

The method may also, or alternatively, assess singing quality by reference to timbre. Perception of timbre often relates to the voice quality. Timbre is physically represented by the spectral envelope of the sound, which is captured well by MFCC vectors. Presently, the timbral_dist is computed, and refers to the DTW distance between the MFCC vectors between the renditions of two singers.

B. Singer Characterization Using Inter-Singer Distance

Figure 6:
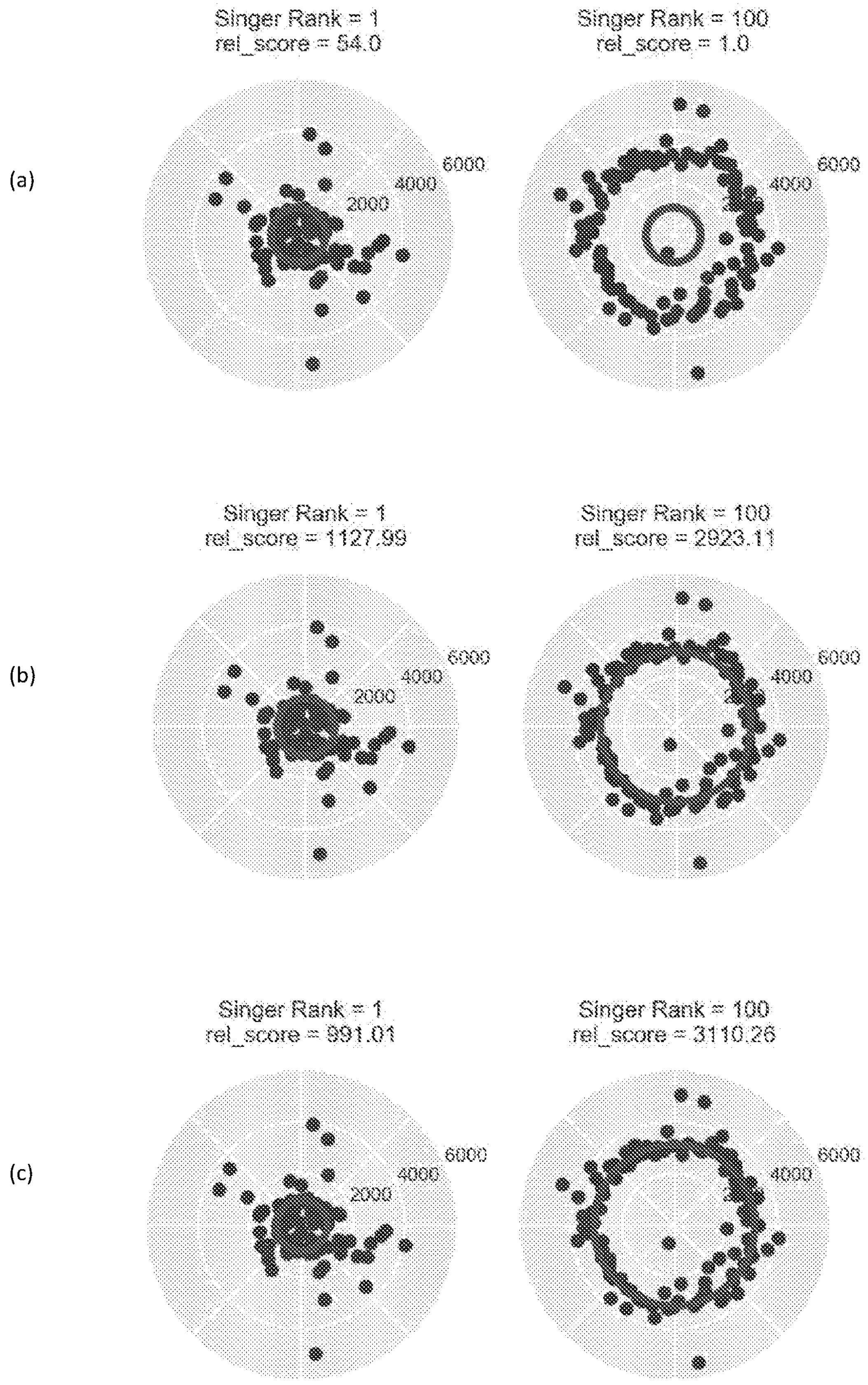
FIG. 6 demonstrates relative scoring methods from the pitch_med_dist measure for the best (Rank 1) and the worst (Rank 100) singer of an example song (Song 1, snippet 1), along with the respective relative measure values or scores using: (a) Method 1: Affinity by Headcount (b) Method 2: Affinity by kth Nearest Distance, k=10 (c) Method 3: Affinity by Median Distance. The circle in (a) and (b) are the thresholds, while for (c) it is the median value.

The distance between a singer and others, as discussed in relation to the Musically-Motivated inter-Singer distance metrics, is indicative of the singer's singing quality. Present methods may employ one or more of three methods for characterising a singer based on these inter-singer distance metrics. These methods may be referred to as relative scoring methods, that give rise to the relative measures. Relatedly, FIG. 6, referred to below, demonstrates the relative measure computation from the pitch median dist distance metric with the three methods for the best and the worst singer out of 100 singers of a song.

1) Method 1: Affinity by Headcount $s_h(i)$:

The present methods may determine distance by reference to Affinity by headcount. This may involve setting a constant (i.e. predetermined) threshold $D_T$ on the distance value across all singer clusters and counting the number of singers within the set threshold as the relative measure or score. If a large number of singers are similar to that singer—i.e. within the constant threshold—then the number of dots within the threshold circle will be high. This is reflected in FIG. 6(*a*). If $dist_{i,j}$ is the distance between the $i^{th}$ and $j^{th}$ singers, the singer i's relative measure $s_h(i)$ by this head-count method is:

$$s_h(i)=|dist_{i,j}<D_T:\forall j\in Q, j\neq i| \quad (11)$$

where Q is the set of singers.

2) Method 2: Affinity by kth Nearest Distance $s_k(i)$:

The present methods may determine distance by reference to the $k^{th}$ nearest distance. The number of singers k can be set as the threshold, and consideration is then given to the distance of the $k^{th}$ nearest singer as the relative measure. This is reflected in FIG. 6(*b*), for k=10. If this distance is small, the singer is likely to be good. Therefore the present method may involve assessing quality of the first input by reference to the distance of a predetermined one of the distances in a sequence arranged in order of distance, from the further inputs. Singer i's relative measure ($s_k(i)$) according to this Method 2 may be defined as:

$$s_k(i)=dist_{i,j=k}; k\neq i \quad (12)$$

3) Method 3: Affinity by Median Distance $s_m(i)$:

The present methods may determine distance by reference to median distance for all further inputs. The median of the distances of a singer from all other singers can be assigned as the relative measure, which represents his/her overall distance from the rest of the singers (FIG. 6(*c*)). The median is taken instead of the mean to avoid outliers. If this distance is small for a singer, the singer is likely to be good. Methods described herein may therefore involve assessing the quality of the first input by reference to the median distance, where a lower median distance is indicative of a higher quality singing voice. The singer i's relative measure by this method is:

$$s_m(i)=\text{median}(dist_{i,j}); \forall j\in Q, j\neq i \quad (13)$$

Ranking Strategy, and Fusion Methods

Being able to determine how good a particular singer is, is desirable. This can be achieved using the methods and various metrics and measures as set out above. Notably, the same assessment can be extended to a second input (i.e. for a second singer), and any other number of singers. In this regard, the second input may comprise a recording of a singing voice singing the same song as that sung in the first input and any other further inputs. The method may then rank the first input against the second input and determine the first input to be of higher quality than the second input if the similarity between the first input and each further input is greater than a similarity between the second input and each further input. Similarly, the first input may be ranked among all of the inputs, including the further inputs. Each of these rankings can enable a leader board to be established in which singers are ranked against each other.

A. Strategy for Ranking

The primary objective of a leader board is to inform where a singer ranks with respect to the singer's contemporaries. As the best-worst scaling (BWS) theory, it is understood that humans are known to be able to choose the best and the worst in a small set of choices, which over many such sets results in rank-ordering of the choices. However, when humans are asked to numerically rate singers on a scale of say 1 to 5, they do not reveal discriminatory results. Therefore, it makes sense to study how the absolute and relative measures reflect the ranking, and design an algorithm towards a better prediction of the overall rank-order of the singers.

Given a set of measure values or scores $S=S_1, S_2, \ldots, S_T$, where $S_i$ represents a score of the $i^{th}$ singer, and, T is the total number of singers of a song, the singers can be rank-ordered as:

$$r\text{order}=(S_{(1)}, S_{(2)}, \ldots, S_{(T)}) \quad (14)$$

where $$S_{(1)}\leq S_{(2)}\leq \ldots \leq S_{(T)} \quad (15)$$

It is worth noting that all absolute and relative measures are song independent. But a large number of singers singing the same song are needed to reliably provide the relative measures. Also, every measure is normalised by the number of frames, making them independent of the song duration.

B. Strategies for Score Fusion

Each of the absolute and relative measures can provide a rank-ordering of the singers. To arrive at an overall ranking of the singers, the methods may involve ordering absolute and/or relative measure values for each input in order from largest to smallest. Alternatively, the method may comprise combining or fusing the absolute and/or relative measure values together for a final ranking.

Where multiple measures are used, the method may involve computing an overall ranking by computing an average of the ranks (AR) of all the measures foe each singer. This method of score fusion does not need any statistical model training, but gives equal importance to all the measures. Considering that some measures are more effective than others, the method may instead employ a linear regression (LR) model that gives different weights to the measures. Owing to the success of neural networks and the possibility of a non-linear relation between the measures and the overall rank, the method may instead employ a neural network model to predict the overall ranking from the absolute and the relative measures. For experimental purposes, a number of neural network models were considered. One of the neural network models (NN-1) consists of no hidden layers, but a non-linear sigmoid activation function. The other neural network model (NN-2) consists of one hidden layer with 5 nodes, with sigmoid activation functions for both the input and the hidden layers. The models are summarized in Table II.

TABLE II summary of the fusion models

| # | Model | Description | Equation |
|---|---|---|---|
| 1 | AR | Equally weighted sum of individual measure ranks | $y=\frac{1}{N}\sum_{i=1}^{N} r_i$ |
| 2 | LR | Weighted sum of measures | $y = b + w^T x$ |
| 3 | NN-1 | MLP with sigmoid activation, no hidden layer | $y = S\,(b + w^T x)$ |
| 4 | NN-2 | MLP with sigmoid activation, one hidden layer with five nodes | $y = s\,(b^{(2)} + w^{(2)}\, S\,(b^{(1)} + w^{(1)^T} x))$ |

In Table-II, $r_i$=is the rank-ordering of singers according to $i^{th}$ measure, N=the number of measures, x is a measure vector, $w^i$ is a wait vector of the $i^{th}$ layer, b is a bias, S(•) is the sigmoid activation function, R(•) is the ReLU activation function, y is the predicted score, AR is the average rank and LR is the linear regression.

The performance of the fusion of the two scoring systems, i.e. fusion of the 8 absolute measures system and the 11 relative measures system, was also investigated. The methods taught herein may combine them in any appropriate manner. One method to combine them is early-fusion where all the scores from the evaluation measures are incorporated to get a 19 dimensional score vector for each snippet of each input. Another method of combining the measures is late-fusion, where the average of the ranks predicted independently from the absolute and the relative scoring systems are computed.

Data Preparation

To evaluate singing quality without a reference, experiments were conducted using the musically-motivated absolute measures, the inter-singer distance based relative measures, and the combinations of these measures. Discussed below are the singing voice dataset and the subjective ground-truths used for these experiments.

A. Singing Voice Dataset

The dataset used for experiments consisted of four popular Western songs each sung by 100 unique singers (50 male, 50 female) extracted from Smule's DAMP dataset. For the purpose of analysis, it is assumed that all singers are singing the same song. DAMP dataset consists of 35,000 solar-singing recordings without any background accompaniments. The selected subset of songs with the most popular for songs in the DAMP dataset with more than 100 unique singers singing them. Songs were also selected with equal or roughly equal number of male and female singers to avoid gender bias. All the songs are rich in steady nodes and rhythm, as summarised in Table-III. The dataset consists of a mix of songs with long and sustained as well a short duration nodes with a range of different tempi in terms of beats per minute (bpm).

TABLE III summary of the singing voice dataset. Nodes can be of short, long or mixed durations

| # | Song Name | Nature of Melody: Pitch Range | Note duration | Tempo (bpm) |
|---|---|---|---|---|
| 1 | Let it go (Frozen) | More than an octave | Mix | 68 |
| 2 | Cups (Pitch Perfect) | Within an octave | Short | 130 |
| 3 | When I was your man (Bruno Mars) | More than an octave | Mix | 73 |
| 4 | Stay (Rhianna) | Within an octave | Mix | 112 |

The methods disclosed herein may employ and autocorrelation-based pitch estimator to produce pitch estimates. For example, the pitch estimates may be determined from the autocorrelation-based pitch estimator PRAAT. PRAAT gives the best voicing boundaries for singing voice with the least number of post-processing steps or adaptations, when compared to other pitch estimators such as source-filter model based STRAIGHT and modified autocorrelation-based YIN. The method may also apply a generic post-processing step to remove frames with low periodicity.

B. Subjective Ground-Truth

To validate the objective measures for singing evaluation, subjective ratings are required as ground-truth. Consistent ratings can be obtained from professionally trained music experts. However, obtaining such ratings at a large scale may not be always possible, as it can be time consuming, and expensive. Crowd sourcing platforms, such as Amazon mechanical turk (MTurk), is effective to obtain reliable human judgments of singing vocals. Ratings provided by MTurk users demonstrably correlated well with ratings obtained from professional musicians in a lab-controlled experiment. The Pearson's correlation between lab-controlled music-expert ratings and filtered MTurk ratings for various parameters are as follows: overall singing quality: 0.91, pitch: 0.93, rhythm: 0.93, and voice quality: 0.65. Given the high correlation, MTurk was used to derive the subjective ground-truth for present experiments.

While it is possible that professional musicians rate singing quality at an absolute scale of 5 consistently, the ratings through crowd sourcing are less certain. Also, absolute ratings are known to not discriminate between items, and each rating on the scale is not precisely defined. Therefore, the present methods used in experimental assessments employed a relative rating called best-worst scaling (BWS) which can handle a long list of options and always generates discriminating results as the respondents are asked to choose the best and worst option in a choice set. At the end of this exercise, the items can be rank-ordered according to the aggregate BWS scores of each item, given by:

$$B = \frac{n_{best} - n_{worst}}{n} \tag{16}$$

where $n_{best}$ and $n_{worst}$ are the number of times the item is marked as best and worst respectively, and n is the total number of times the item appears.

The Spearman's rank correlation between the MTurk experiment and the lab-controlled experiment was 0.859.

A pairwise BWS test was also conducted on MTurk where a listener was asked to choose the better singer among a pair of singers singing the same song. One excerpt of approximately 20 seconds from every singer of a song (the same 20 seconds for all the singers of a song) was presented. There are ${}^{100}C_2$ number of ways to choose 2 singers from 100 singers of a song, i.e. 4,950 Human Intelligence Tasks (HITs) per song. This experiment was conducted separately for each of the 4 songs of Table-III. Therefore there were in total 4,950×4=19,800 HITs.

Filters were applied to the MTurk users. The users were asked for their experience in music and to annotate musical notes as a test. Their attempt was accepted only if they had some formal training in music, and could write the musical notations successfully. A filter was also applied on the time spent in performing the task to remove the less serious attempts where the MTurk users may not have spent time listening to the snippets.

Experiments

Figure 7:
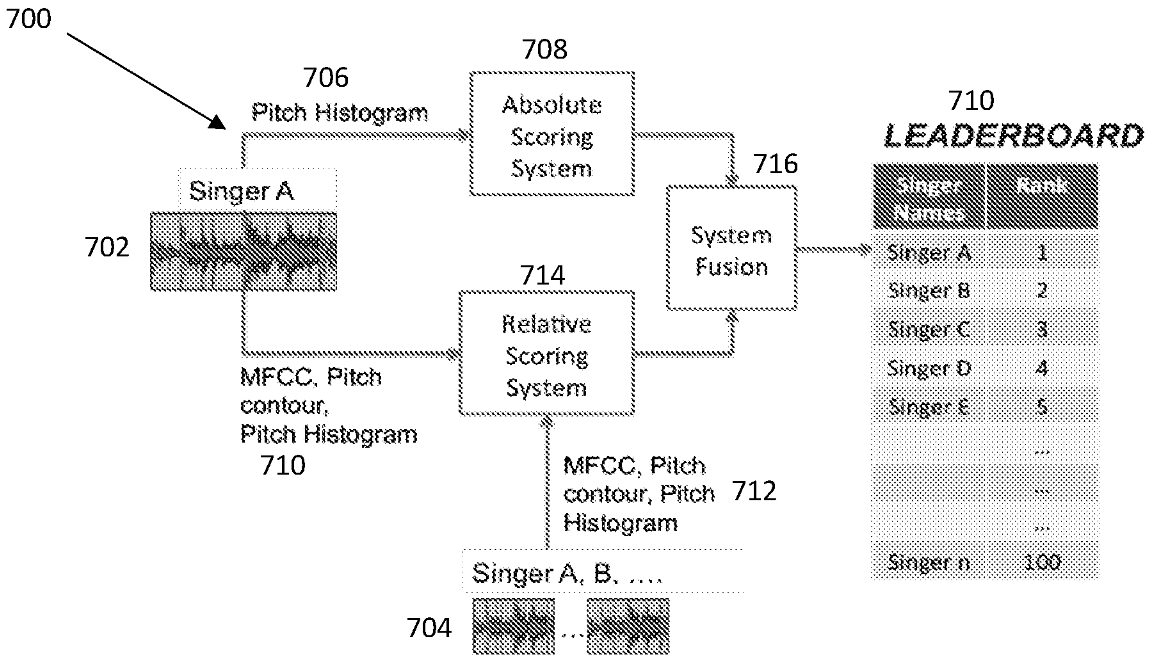
FIG. 7 is an overview of the framework for automatic singing quality leader board generation, consisting of a fusion of a musically-motivated absolute scoring system and an inter-singer distance based scoring system.

In the sections entitled Inter-singer measures and Musically-motivated measures, various musically-motivated absolute and relative objective measures were designed. It is expected that these measures can assess the inherent properties of singing quality that are independent of a reference. When the absolute and relative measures are appropriately combined, a leader board of singers can be generated ranked in the order of their singing ability. FIG. 7 shows the overview of this framework 700, in which Singer A (the singer in question) provides a first input 702. The first input 702 is a recording of the singing voice of Singer A. One or more further inputs 704 are received, which in the present embodiment include a recording by Singer A but in other embodiments may not. A pitched histogram is developed for Singer A (at 706), from which absolute measures are determined (at absolute scoring system 708). Notably, the absolute measures do not reference the one or more further inputs 704. Various features, such as MFCC, pitch contour and/or pitched histogram, are calculated for the first input 702 (at 710) and for the one or more further inputs 704 (at 712).

These features are inputted into a relative scoring system 714 that scores the first input 702 relative to the one or more further inputs 704. The scores produced by the absolute scoring system 708 and the relative scoring system 714 are fused at system fusion module 716. The system fusion module 716 determines the quality of the singing voice for the singer in question. The same process can be undertaken for additional singing voices, all of which can then be ranked on leaderboard 710. In the present case, the analysis of the voice of Singer A may include using all of the one or more further inputs 704 except the input provided by Singer A. The same analysis can then be conducted for each individual input of the one or more further inputs 704, in a leave one out data set—i.e. input 702 may taken from the one or more inputs 704, and relative measures for input 702 can then be determined with reference to each remaining input of the one or more inputs 704.

Various methods to combine the absolute and relative measures were explored, as discussed under the heading "Ranking strategy and fusion models—B. Strategy for score fusion". The rank-order of the individual measures are averaged to obtain an average rank (AR). The linear regression model was trained, and the two different neural network models (NN-1, NN-2) were employed in 10-fold cross-validation. The absolute and relative measure values are the inputs to these networks, while the human BWS scores given in Equation (16) are the output values to be predicted. The loss function for the neural networks is the mean squared error, with adam optimiser. It was ensured that, in every fold, an equal number of singers are present from every song, both in training and test data. All computations are done using scikit-learn.

To validate the present hypothesis, several experiments were conducted. The role of the absolute and the relative measures were investigated individually in predicting the overall human judgment, and the methods of combining these measures. The influence of the duration of a song excerpt for computational singing quality analysis was also observed. Moreover, the ability of the present machine-based measures was compared with humans in predicting the performance of the underlying perceptual parameters.

In this regard, the baseline system performance from literature, and the achievable upper limit of performance in the form of the human judges' consistency in evaluating singing quality is useful to understand.

A. Baseline

The global statistics kurtosis and skew were used to measure the consistency of pitch values. These are two of the presently presented eight absolute measures. Moreover, the Interspeech ComParE 2013 (Computational Paralinguistics Challenge) feature set can be used as a baseline. It comprises of 60 low-level descriptor contours such as loudness, pitch, MFCCs, and their 1st and 2nd order derivatives, in total 6,373 acoustic features per audio segment or snippet. This same set of features was extracted using the OpenSmile toolbox to create the present baseline for comparison. A 10-fold cross-validation experiment was conducted using the snippet 1 from all the songs to train a linear regression model with these features. The Spearman's rank correlation between the human BWS rank and the output of this model is 0.39. This rank correlation value is an assessment of how well the relationship between the two variables can be described using a monotonic function. This implies that with the set of known features, the baseline machine predicted singing quality ranks has a positive but a low correlation with that given by humans.

B. Performance of Human Judges

In a pilot study, 5 professional musicians were recruited to provide singing quality ratings for 10 singers singing a song. These musicians were trained in vocal and/or musical instruments in different genres of music such as jazz, contemporary, and Chinese orchestra, and all of them were stage performers and/or music teachers. The subjective ratings obtained from them showed high inter-judge correlation of 0.82. This shows that humans do not always agree with each other, and there is, in general, an upper limit of the achievable performance of any machine-based singing quality evaluation. Thus, the goal of the present singing evaluation algorithm is to achieve this upper limit of correlation with human judges.

Figure 8:
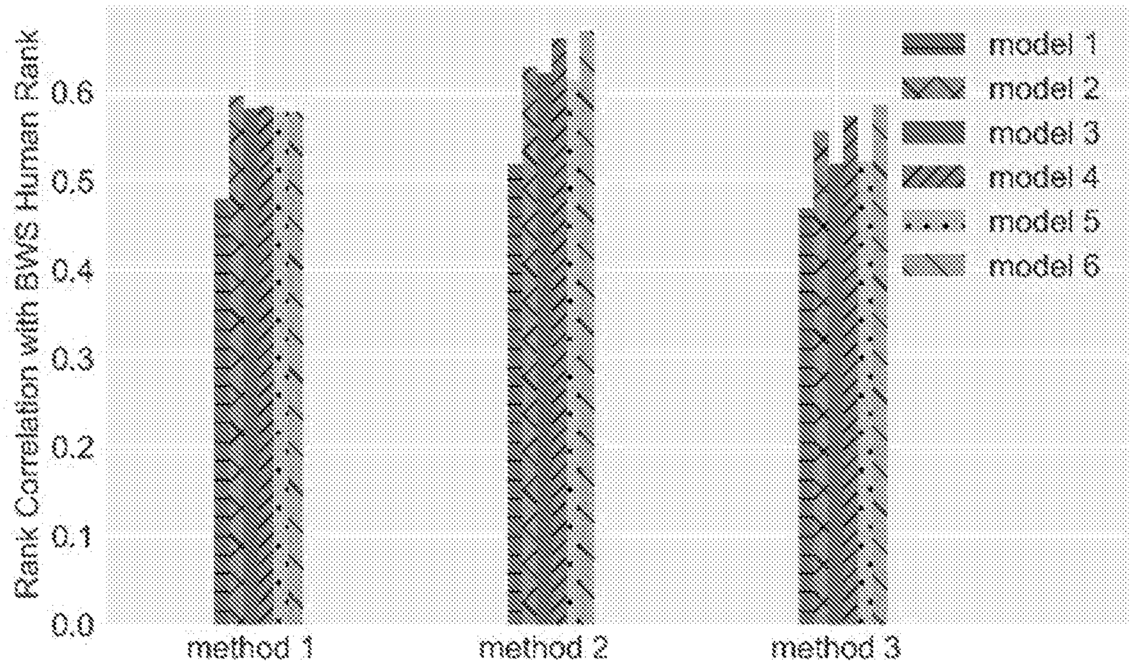
FIG. 8 is the Spearman's rank correlation performance of three methods for inter-singer distance measurement (Singer characterisation using inter-singer distance): Method 1: Affinity by Headcount; Method 2: Affinity by 10th Nearest Distance; Method 3: Affinity by Median Distance.

C. Experiment 1: Comparison of Singer Characterization Methods Using Inter-Singer Distance In this experiment, a preliminary investigation was performed to compare the three singer characterization methods discussed in under the heading Inter-singer measures—Singer characterisation using inter-singer distance. The relative measures were obtained from these methods for each of the 11 inter-singer distance measures. FIG. 8 shows the Spearman's rank correlation of the human BWS ranks with ranks from these relative measures used with the six models of Table II, over the snippet 1 of all the 4 songs for the three methods. To observe the best case scenario for method 1, its distance threshold is optimized for each measure for snippet 1. The number of singers threshold for method 2 is empirically set as 10 singers, assuming that roughly at least ten percent of singers in a large pool of singers would be good. In this way, if the distance of a particular singer from the $10^{th}$ nearest singer is small, it means that the singer sings very similarly to 10 singers, thus the singer is good.

It was observed that method 2 ($k^{th}$ nearest distance method) performs better than the other two methods for all the six models. The result suggests that our assumption that at least ten percent in a pool of singers would be good, serves our purpose. Method 3, i.e. the median of the distances of a particular singer from the rest of the singers assumes that half of the pool of singers would be good singers, which is not a reliable assumption, therefore this method performs the worst.

With the preliminary findings, it was determined that the relative measures should be computed using method 2 in the rest of the experiments. Thus, while the present methods may employ any one of methods 1 to 3 is assessing inter-singer distance measures, a preferred embodiment employs method 2.

D. Experiment 2: Evaluating the Measures Individually

Figure 9:
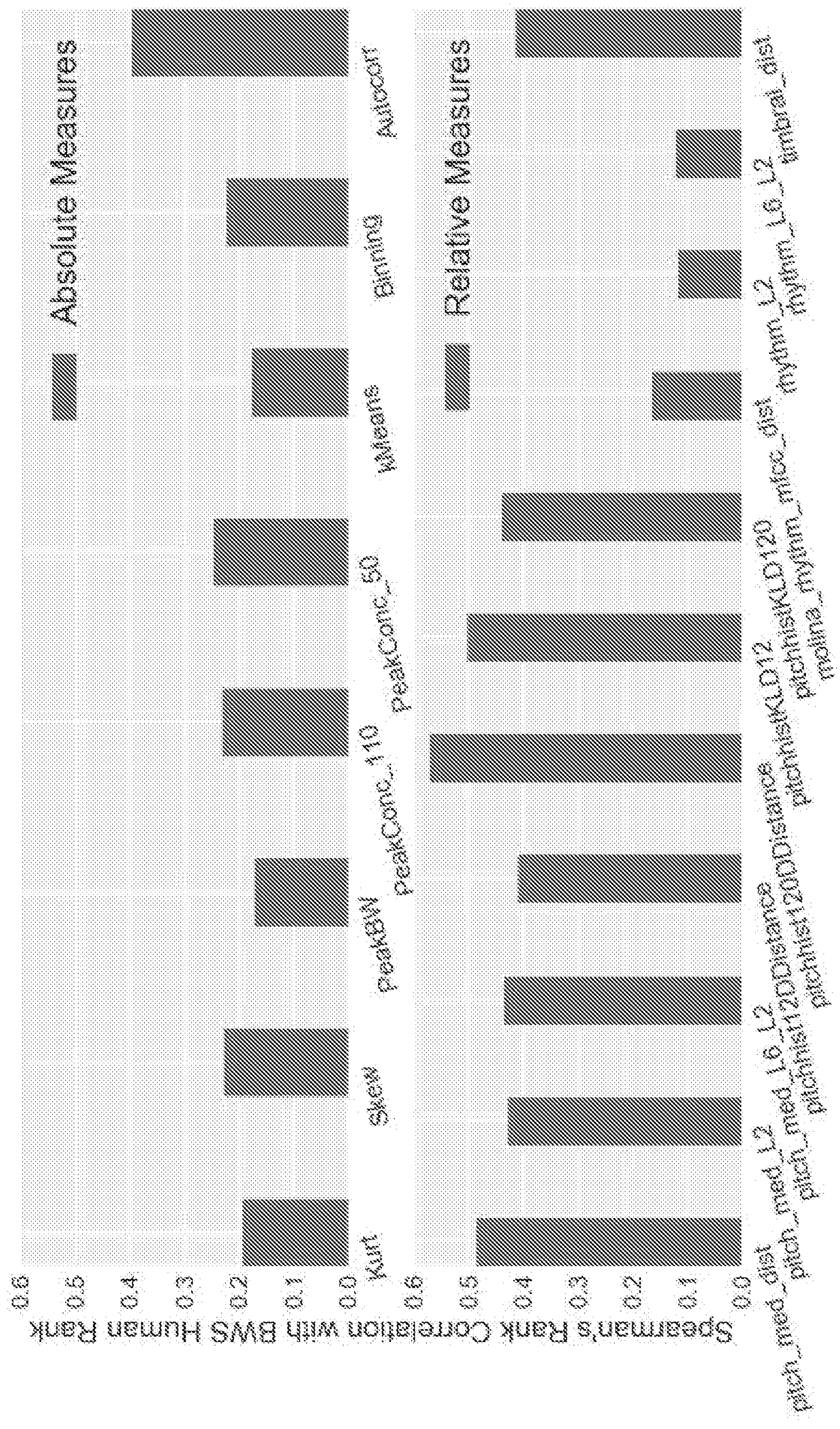
FIG. 9 shows the Spearman's rank correlation of the individual absolute measures (top) and relative measures (bottom) with human BWS ranks.

An analysis was then performed as to how well each of the absolute and relative measures can individually predict the ranks of the singers. FIG. 9 shows the Spearman's rank correlation of each of the 8 absolute and the 11 relative score vectors with the human BWS ranks. It is clear that all the derived measures show a positive correlation with humans, although some correlate better than others. The Autocorr measure shows the best correlation among the absolute measures. This suggests that the interval pattern of the dominant notes in the histogram carry important information about singing quality. Thus, in a preferred embodiment, the method assessing singing quality of the first input (and other inputs as necessary) by computing the interval pattern of dominant notes is an input. The $PeakConc_{50}$ shows better performance than $PeakConc_{110}$, which agrees findings in literature that the human ear is sensitive to changes in pitch as small as 25 cents.

The relative measures, in general, perform better than the absolute measures, which means that the inter-singer comparison method is closer to how humans evaluate singers. The pitch-based relative measures perform better than the rhythm-based relative measures. This is an expected behaviour for karaoke performances, where the background music and the lyrical cues help the singers to maintain their timing. Therefore, the rhythm-based measures do not contribute as much in rating the singing quality. Among the relative measures, pitchhist120DDistance performs the best, along with the KL-divergence measures, showing that inter-singer pitch histogram similarities is a good indicator of singing quality. The pitch_med_dist measure follows closely, indicating that the comparison of the actual sequence of pitch values and the duration of each note give valuable information for assessing singing quality. These aspects are not captured by pitch histogram-based methods.

Another interesting observation is the high correlation of the timbral_dist measure. It indicates that voice quality, represented by the timbral distance, is an important parameter when humans compare singers to assess singing quality. This observation supports the timbre-related perceptual evaluation criteria of human judgment such as timbre brightness, colour/warmth, vocal clarity, strain. The timbral distance measure captures the overall spectral characteristics, thus represents the timbre-related perceptual criteria.

E. Experiment 3: Absolute Scoring System: The Fusion of Absolute Measures

In this experiment, the performance of the combination of musically-motivated pitch histogram-based absolute measures, introduced in the section entitled Musically-motivated measures in ranking the singers, was evaluated. Table IV shows the Spearman's rank correlation between the human BWS ranks and the ranks predicted by absolute measures with different fusion models. Four different snippets were evaluated from each song and the ranks were averaged over multiple snippets. The last column in Table-IV shows the performance of the absolute measures extracted from the full song (more than 2 minutes' duration) (AbsFull) combined with the individual snippet ranks.

TABLE IV evaluation of absolute measures. The values in the table are Spearman's rank correlation between the human BWS ranks and the machine generated ranks (all P-values < 0.05)

| Model # | Snippet 1 | Snippet 1 + 2 | Snippet 1 + 2 + 3 | Snippet 1 + 2 + 3 + 4 | Snippet 1 + 2 + 3 + 4 + AbsFull |
|---|---|---|---|---|---|
| 1 | 0.3556 | 0.4134 | 0.4702 | 0.4796 | 0.4796 |
| 2 | 0.3695 | 0.3879 | 0.4143 | 0.4205 | 0.4558 |
| 3 | 0.3329 | 0.3567 | 0.3917 | 0.3975 | 0.4331 |
| 4 | 0.3073 | 0.3372 | 0.3866 | 0.3838 | 0.4228 |
| 5 | 0.3924 | 0.4589 | 0.4781 | 0.4711 | 0.4942 |
| 6 | 0.386 | 0.4475 | 0.465 | 0.4603 | 0.4887 |

1) Effect of duration: The pitch histogram for the full song is expected to show a better representation than the histogram of a snippet of the song because more data results in better statistics. As seen in Table IV, with an increase in the number of snippets, i.e. increase in the duration of the song being evaluated, the predictions improve, with the one with the full song performing the best. This indicates that more data (~80 seconds) provides better statistics, therefore, better predictions, while humans can judge reliably by a shorter duration clip of ~20 seconds.

2) Effect of the score fusion models: As some absolute measures are more effective than others, the weighted combination with non-linear activation functions (Models 5 and 6) show a better performance than the equally weighted average of ranks (Model 1). One hidden layer in the neural network model (NN-2) performs better than the one without a hidden layer (NN-1), as well as the LR model. This indicates that non-linear combination of the measures provides a better prediction of human judgement. Interestingly, the average of ranks (Model 1) performs comparably with NN-2, suggesting that all measures are informative in making a meaningful ranking. It also indicates that although the measures individually may not have performed equally well (FIG. 9), each of them captures a different aspect of the pitch histogram quality, therefore, combining them with equal weights results in a comparable performance.

It is important to note that there are specific conditions when the absolute measures fail to perform. By converting a pitch contour into a histogram, information about timing or rhythm is lost. The correctness of the note order also cannot be evaluated through the pitch histogram. Moreover, the relative positions of the peaks in the histogram cannot be modelled without a reference, i.e. incorrect location of peaks goes undetected. For example, if a song consists of five notes, and a singer sings five notes precisely but they are not the same notes as those present in the song, then the absolute measures would not be able to detect the erroneous singing. The pitch histogram also loses information about localized errors, i.e. errors occurring for a short duration. According to cognitive psychology and PESnQ measures, localized errors have greater subjective impact than distributed errors. Therefore, if a singer sings incorrectly for a short duration, and then corrects himself/herself, the absolute measures are unable to capture it.

F. Experiment 4: Relative Scoring System: Evaluating the Fusion of Relative Measures In this experiment, the performance of the combination of the inter-singer relative measures computed from method 2, discussed in under heading "EXPERIMENTS—Experiment 1: Comparison of Singer Characterization Methods using Inter-Singer Distance", were investigated. Table V, third column shows the Spearman's rank correlation between the human BWS ranks and the ranks predicted by the relative measures with the different fusion models. Four snippets were evaluated from each song and ranks were averaged over the snippets. Again, preliminary experiments suggested that samples of longer duration lead to better statistics and, therefore, more accurate scores.

TABLE V summary of the performance of absolute and relative measures, and their combinations. The values in the table are Spearman's rank relation between human BWS ranks and the machine generated ranks averaged over for snippets. (all P-values < 0.05)

| Model # | Absolute measures | Relative measures | Early-fusion | Late-fusion |
|---|---|---|---|---|
| 1 | 0.4796 | 0.6396 | 0.6877 | 0.7059 |
| 2 | 0.4205 | 0.5737 | 0.6413 | 0.6426 |
| 3 | 0.3975 | 0.5799 | 0.6385 | 0.6407 |
| 4 | 0.3838 | 0.5688 | 0.6222 | 0.6274 |
| 5 | 0.4711 | 0.6153 | 0.6636 | 0.6692 |
| 6 | 0.4603 | 0.602 | 0.6623 | 0.6678 |

The combinations of the relative measures result in a better performance than the combinations of the absolute measures. This follows from the observation in Experiment 2 (Evaluating the measures individually) that the relative measures individually perform better than the absolute measures. Like the absolute measures, average of ranks (AR)

performs better than the other score fusion models, indicating that all relative measures are informative in making meaningful ranking.

G. Experiment 5: System Fusion: Combining Absolute and Relative Scoring Systems

In this experiment, combinations of the 8 absolute and 11 relative measures were investigated by early-fusion and late-fusion methods (see B. Performance of human judges). The rank correlation between the BWS ranks and the ranks obtained from early-fusion method averaged over four snippets is reported in column 4, Table V, and that from late-fusion is in column 5.

The results suggest that the late-fusion of the systems show a better correlation with humans than early-fusion. This means that predictions given separately from the absolute and the relative measures provide different and equally important information. Therefore, equal weighting to both shows better correlation with humans. Moreover, a simple rank average shows a better performance than the complex neural network models. This shows that the individual measures, although showing different levels of correlation with humans, individually capture different information about singing quality. It is important to note that the process of converting values to ranks is inherently non-linear.

H. Experiment 6: Humans Versus Machines

An important advantage of objective methods for singing evaluation is that each underlying perceptual parameter is objectively evaluated independently of the other parameters, i.e. the computed measures are uncorrelated amongst each other. On the other hand, the individual parameter scores from humans tend to be biased by their overall judgment of the rendition. For example, a singer who is bad in pitch, may or may not be bad in rhythm. However, humans tend to rate their rhythm poorly due to bias towards their overall judgment.

Figure 10:
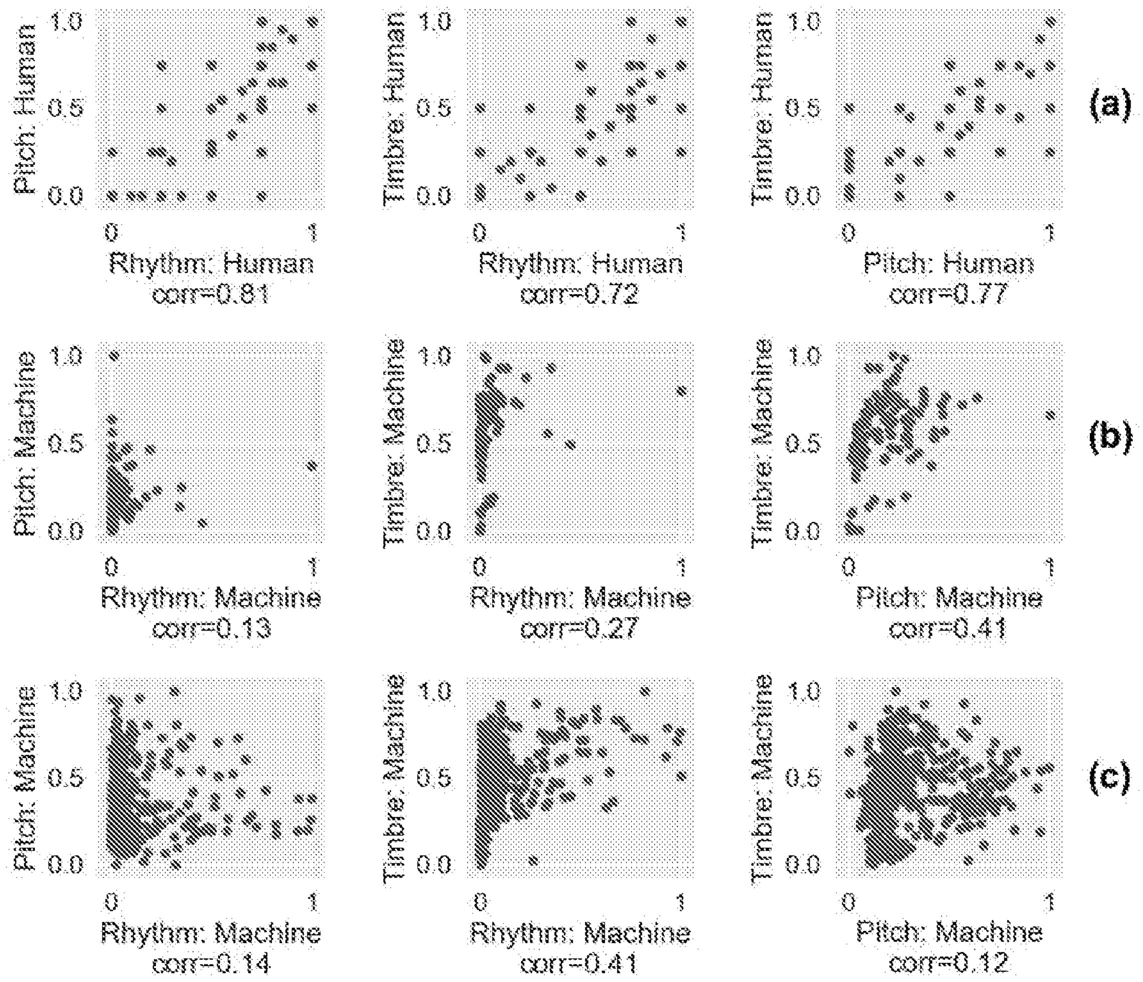
FIG. 10 shows the Humans vs. Machines experimental outcomes: correlation between scores given individually for pitch, rhythm, and timbre by (a) human experts, (b) machine on the same data as in (a), and (c) machine, on the data used in this work, as reflected in Table III.

In this experiment, data was used where music experts were asked to rate each singer on a scale of 1 to 5 with respect to the three perceptual parameters pitch, rhythm, and timbre individually. FIG. 10(*a*) shows that human ratings for the three perceptual parameters are highly correlated amongst each other. On the same data, machine scores for the three parameters show significantly less correlation (FIG. 10(*b*)). This observation was also verified on the data used for the experiments in this work (FIG. 10(*c*)). Therefore, machine scores are better than humans in giving unbiased objective feedback to a singer on the underlying perceptual details of their rendition. This feedback can be useful to a learner for understanding how they can improve upon the individual parameters.

I. Discussion

The experimental results show that the derived absolute and relative measures are reliable reference-independent indicators of singing quality. With both absolute and relative measures, the proposed framework effectively addresses the issue with pitch interval accuracy by looking at both the pitch offset values as well as other aspects of the melody. The absolute measures such as $\rho_c$, $\rho_b$ and $\alpha$ characterised the pitch histogram of a given song. Furthermore, the relative measures compare a singer with a group of other singers singing the same song. It is unlikely for all singers in a large dataset to sing one note throughout the song.

The present experiments show that 100 rendition from different singers constituted database for a reliable automatic leaderboard ranking. The absolute measures in the framework are independent of the singing corpus size, by the relative measures are scalable to a larger corpus.

The proposed strategy of evaluation is applicable for large-scale screening of singers, such as in singing idol competitions and karaoke apps. In this work emphasis was given to the common patterns in singing. This work explores Western pop, to endeavour to provide a large-scale reference-independent singing evaluation framework.

CONCLUSIONS AND FUTURE WORK

In this work, a method for assessing singing quality was introduced as was a self-organizing method for producing a leader board of singers relative to their singing quality without relying on a reference singing sample or musical score, by leveraging on musically-motivated absolute measures and veracity based inter-singer relative measures. The baseline method (A. Baseline) shows a correlation of 0.39 with human assessment using linear regression, while the linear regression model with the presently proposed measures shows a correlation of 0.64, and the best performing method shows a correlation of 0.71, which is an improvement of 82.1% over the baseline. This improvement is attributed to:

the musically-motivated absolute measures, that quantify various singing quality discerning properties of the pitch histogram, and the veracity based musically-informed relative measures that leverage on inter-singer statistics and overcome the drawbacks of using only absolute measures.

It was found that the two kinds of measures provide distinct information about singing quality, therefore a combination of them boosts the performance.

It was also found that the proposed ranking technique provides objective measures for perceptual parameters, such as pitch, rhythm, and timbre independent, that human subjective assessment fails to produce.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word “comprise”, and variations such as “comprises” and “comprising”, will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A system for assessing quality of a singing voice singing a song, comprising:

memory; and at least one processor, wherein the memory stores instructions that, when executed by the at least one processor, cause the at least one processor to:

receive a plurality of inputs comprising a first input and one or more further inputs, each input comprising a recording of a singing voice singing the song;

determine, for the first input:

one or more relative measures of quality of the singing voice by comparing the first input to each further input; and one or more absolute measures of quality of the singing voice; and assess quality of the singing voice of the first input based on the one or more relative measures and the one or more absolute measures.

2. A system according to claim 1, wherein the at least one processor determines one or more relative measures by assessing a similarity between the first input and each further input.

3. A system according to claim 2, wherein the at least one processor assesses a similarity between the first input and each further input by, for each relative measure, assessing one or more of a similarity of pitch, rhythm and timbre.

4. A system according to claim 3, wherein the at least one processor assesses the similarity of pitch, rhythm and timbre as being inversely proportional to a pitch-based relative distance, rhythm-based relative distance and timbre-based relative distance respectively of the singing voice of the first input relative to the singing voice of each further input.

5. A system according to claim 2, wherein, for a second input comprising a recording of a singing voice singing the song, the at least one processor determines the singing voice of the first input to be higher quality than the singing voice of the second input if the similarity between the first input and each further input is greater than a similarity between the second input and each further input.

6. A system according to claim 1, wherein each absolute measure of the one or more absolute measures is an assessment of one or more of pitch, rhythm and timbre of the singing voice of the first input.

7. A system according to claim 6, wherein at least one said absolute measure is an assessment of pitch based on one or more of overall pitch distribution, pitch concentration and clustering on musical notes.

8. A system according to claim 7, wherein the at least one processor assesses pitch by producing a pitch histogram, and assesses a singing voice as being of higher quality as peaks in the pitch histogram become sharper.

9. A system according to claim 1, wherein the instructions further cause the at least one processor to rank the quality of the singing voice of the first input against the quality of the singing voice of each further input.

10. A method for assessing quality of a singing voice singing a song, comprising:

receiving a plurality of inputs comprising a first input and one or more further inputs, each input comprising a recording of a singing voice singing the song;

determining, for the first input:

one or more relative measures of quality of the singing voice by comparing the first input to each further input; and one or more absolute measures of quality of the singing voice; and assessing quality of the singing voice of the first input based on the one or more relative measures and the one or more absolute measures.

11. A method according to claim 10, wherein determining one or more relative measures comprises assessing a similarity between the first input and each further input.

12. A method according to claim 11, wherein assessing a similarity between the first input and each further input comprises, for each relative measure, assessing one or more of a similarity of pitch, rhythm and timbre.

13. A method according to claim 12, wherein the similarity of pitch, rhythm and timbre are assessed as being inversely proportional to a pitch-based relative distance, rhythm-based relative distance and timbre-based relative distance respectively of the singing voice of the first input relative to the singing voice of each further input.

14. A method according to claim 11, wherein, for a second input comprising a recording of a singing voice singing the song, the singing voice of the first input is determined to be higher quality than the singing voice of the second input if the similarity between the first input and each further input is greater than a similarity between the second input and each further input.

15. A method according to claim 10, wherein each absolute measure of the one or more absolute measures is an assessment of one or more of pitch, rhythm and timbre of the singing voice of the first input.

16. A method according to claim 15, wherein at least one said absolute measure is an assessment of pitch based on one or more of overall pitch distribution, pitch concentration and clustering on musical notes.

17. A method according to claim 16, wherein assessing pitch involves producing a pitch histogram, and wherein a singing voice is assessed as being of higher quality as peaks in the pitch histogram become sharper.

18. A method according to claim 10, further comprising ranking the quality of the singing voice of the first input against the quality of the singing voice of each further input.

* * * * *